(12) United States Patent
Takashima et al.

(10) Patent No.: US 6,831,882 B1
(45) Date of Patent: Dec. 14, 2004

(54) OPTICAL HEAD AND OPTICAL HEAD FEEDER

(75) Inventors: Makoto Takashima, Ikoma (JP); Hideki Aikoh, Higashiosaka (JP); Hideki Nakata, Kyoto (JP); Hironori Tomita, Ikoma (JP); Tadashi Kuroda, Kobe (JP); Toru Tanaka, Kobe (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 665 days.

(21) Appl. No.: 09/869,627
(22) PCT Filed: Oct. 27, 2000
(86) PCT No.: PCT/JP00/07537
§ 371 (c)(1), (2), (4) Date: Jun. 29, 2001
(87) PCT Pub. No.: WO01/33562
PCT Pub. Date: May 10, 2001

(30) Foreign Application Priority Data

Oct. 29, 1999 (JP) .............................. 11-309283
Jun. 12, 2000 (JP) ....................... 2000-175441

(51) Int. Cl.⁷ ................................................ G11B 7/00
(52) U.S. Cl. .................................. 369/44.14; 369/124.01
(58) Field of Search .......................... 369/44.11, 44.14, 369/44.27, 44.32, 47.1, 47.5, 53.1, 112.01

(56) References Cited

U.S. PATENT DOCUMENTS 5,045,867 A * 9/1991 Fuse ........................... 347/256
5,600,619 A * 2/1997 Takekoshi et al. ...... 369/112.01

FOREIGN PATENT DOCUMENTS

| JP | 58-211340 | 12/1983 |
|---|---|---|
| JP | 05-258334 | 10/1993 |
| JP | 7-14201 | 1/1995 |
| JP | 8-36774 | 2/1996 |
| JP | 8-036774 | 2/1996 |
| JP | 9-167368 | 6/1997 |
| JP | 10-233028 | 9/1998 |
| JP | 10-241195 | 9/1998 |
| JP | 11-16202 | 1/1999 |
| JP | 11-25489 | 1/1999 |
| JP | 11-86312 | 3/1999 |
| JP | 11-086312 | 3/1999 |
| JP | 2000-67457 | 3/2000 |
| JP | 2000-163756 | 6/2000 |

OTHER PUBLICATIONS

International Search Report corresponding to application No. PCT/JP00/07537 dated Mar. 6, 2001.
English translation of Form PCT/ISA/210.

* cited by examiner

Primary Examiner—Muhammad Edun

(57) ABSTRACT

An optical head including a light source for emitting luminous energy recordable on a recording medium, a heat radiating section, in contact with the light source, for radiating heat which accompanies the light emission thereof, and a resin-made bench for mounting and fixing the aforementioned elements, or an optical head having a light source for generating luminous energy required for recording on a disk-shaped information recording medium or reproducing information recorded on the disk-shaped information recording medium; a radiator plate, in contact with the light source either directly or indirectly, for guiding heat which accompanies the emission of light by the light source; an objective lens for focusing light on the disk-shaped information recording medium; an objective lens drive unit for driving the objective lens in the focal and radial direction of the medium; a light receiving element for receiving light reflected from the medium; a sheet-shaped flexible circuit for feeding power to the light source and the light receiving element and communicating signals from the light receiving element; and an optical bench holding at least the light source, the objective lens drive unit, the radiator plate and the light receiving element, in which the radiator plate is brought into contact with a heat transfer section provided in the flexible circuit and, by causing the flexible circuit to guide heat from the radiator plate, heat generated by the light source is radiated through the flexible circuit and the radiator plate.

27 Claims, 32 Drawing Sheets

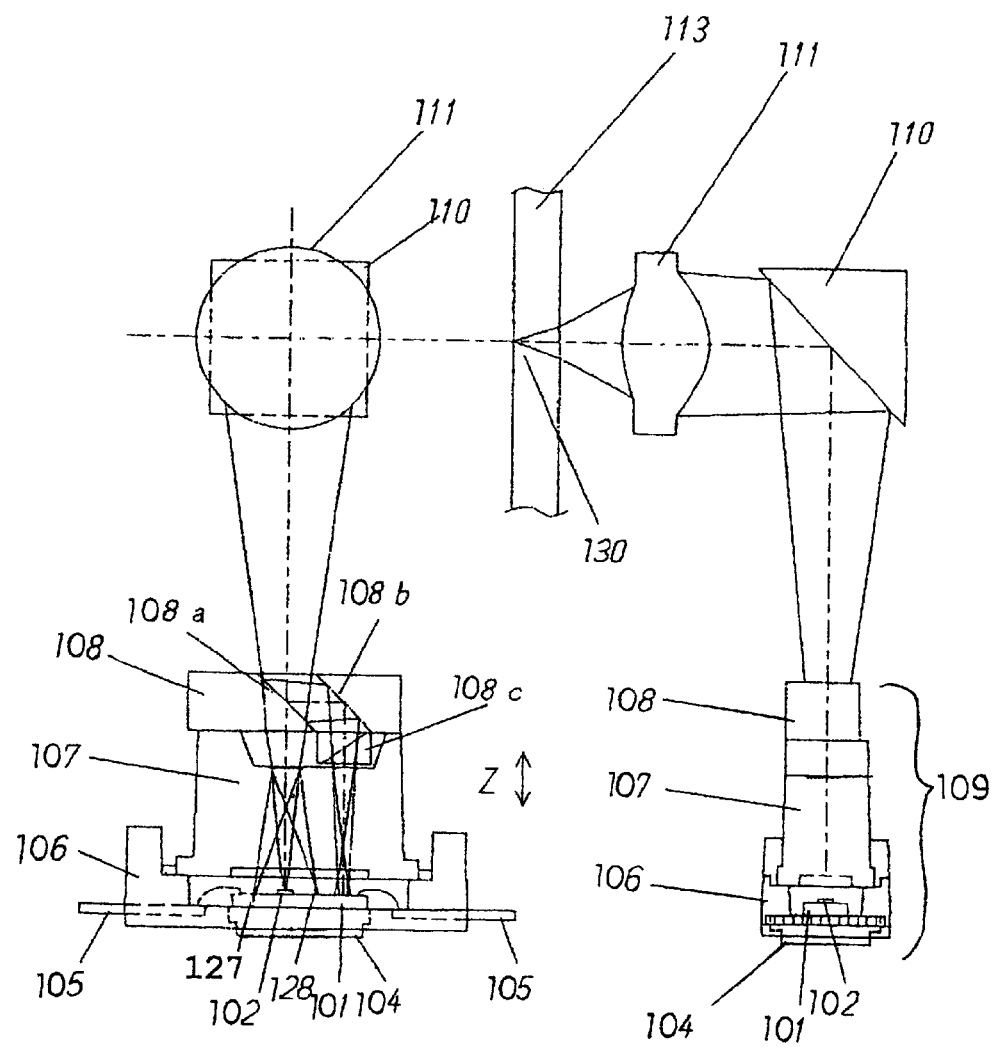

OPTICAL HEAD AND OPTICAL HEAD FEEDER

THIS APPLICATION IS A U.S. NATIONAL PHASE APPLICATION OF PCT INTERNATIONAL APPLICATION PCT/JP00/07537.

TECHNICAL FIELD

The present invention relates to an optical head of an optical disk memory, which is an apparatus for optically recording and reproducing information, and an optical head feed apparatus thereof.

BACKGROUND ART

In this so-called information age, many attempts are being actively made to develop new techniques for high-density large-capacity memories, which constitute the core of information technology. In addition to high density and large capacity, high reliability, rewritability and the like are required of memories, and among memories satisfying these requirements, optical disk memories, such as photomagnetic disks, are attracting particular note.

Many reports can be found on techniques pertaining to optical heads for use with optical disks. Out of various optical heads for use with optical disks, an optical head for use in minidisk apparatuses and the like, which is an optical head for rewritable photomagnetic disks, will be described below with reference to accompanying drawings.

FIG. 7 schematically illustrates an external view of a conventional optical head for use with minidisks and the like. A description of its configuration and operation will follow.

In FIG. 7, reference numeral 1 denotes an optical disk (not shown in the plan), and 2, a light receiving/emitting element configured as a single device mounted inside with a semiconductor laser chip, which is a light emitting section emitting a laser beam, as well as an optical signal detecting section for receiving reflected light resulting from the reflection of this laser beam by the optical disk 1 and detecting various signals.

Reference numeral 3 denotes a mirror for letting the laser beam from the light receiving/emitting element 2 reach the optical disk 1; 4, an objective lens (not shown in the plan) for focusing the laser beam reflected by the mirror 3 on the optical disk 1 and forming a minute light spot; and 5, an objective lens actuator (not shown in the plan) for letting the objective lens 4 follow any eccentricity or surface oscillation of the optical disk 1.

Reference numeral 6 denotes a magnetic head (not shown in the plan) for realizing, where the optical disk 1 is a recordable disk, so-called magnetic field-modulated recording by applying a modulated magnetic field; 6a, a fitting section for fixing the magnetic head 6 to a resin-made bench 7; 7, a resin-made bench on which these parts are mounted; 7a and 7b, reference sections into which shafts 8a and 8b are to be inserted, respectively; 7c, a light receiving/emitting element fixing section to which the light receiving/emitting element 2 is to be fixed; and 7d, a mirror fixing section to which the mirror 3 is to be fixed.

Reference numeral 9 denotes a flexible wiring board to be connected to an external circuit (not shown). To this board, the light receiving/emitting element 2 having a light emitting section and an optical signal detecting section for causing a semiconductor laser to emit light and detecting information signals from the optical disk 1 is electrically connected in a position 9a by soldering a wire or otherwise.

Further, the flexible wiring board 9 is mounted with a high-frequency superimposing circuit (not shown) for reducing noise due to returning light from the optical disk 1.

As described above, in the optical head composed of parts mounted on the resin-made bench 7, a laser beam is emitted by the light receiving/emitting element 2 as power is fed from the flexible wiring board 9, and the objective lens 4 forms a minute light spot in a prescribed position on the optical disk 1 as the objective lens actuator 5 is driven, similarly receiving power feed from the flexible wiring board 9 (the section for power feed to the actuator is not shown).

When a read-only optical disk 1 is to be read back, the magnetic head 6 does not operate, and the light receiving/emitting element 2 detects the so-called reflected light quantity of the optical disk 1. Where the optical disk 1 also permits recording, when it is recording, the light receiving/emitting element 2 emits optical power of a certain intensity, and performs so-called magnetic field-modulated recording with modulated signals from the, magnetic head 6. During a reproducing process, the magnetic head 6 does not operate, and the light receiving/emitting element 2 detects rotation of the polarizing surface from the optical disk 1 to implement the reproducing function.

Incidentally, although the above-described configuration can help reduce the cost and weight of the bench compared with a conventional die-cast metal bench by using a resin as its material, the resin-made bench, which is inferior in thermal conductivity to a metallic bench which excels in heat radiation, reduces head radiation by the semiconductor laser.

FIG. 8 shows the variation in the junction temperature of the semiconductor laser over time. (3) in FIG. 8 shows the temperature rise of the light receiving/emitting element by itself, and (2), its temperature rise when the light receiving/emitting element is mounted on a metallic bench. Comparison of the two curves reveals an approximately 1.9 times as great a rise when the light receiving/emitting element is by itself.

The condition of the light receiving/emitting element mounted on a resin-made bench can be regarded as substantially the same as that of the light receiving/emitting element by itself. However, where a resin-made bench is used, there is the problem that the temperature rise of the light emitting section shortens the service life of the semiconductor laser.

Moreover, when the temperature of the semiconductor laser rises, the amperage required to emit the same optical power also increases, entailing the problem of increased power consumption.

Furthermore, in a recording type optical head, the semiconductor laser is caused to emit light under high-frequency superimposition to reduce noise due to returning light.

However, a configuration of the optical head using a resin-made bench also involves the problem that the ground of the optical head consists only of a flexible wiring board connected to an external circuit, and can be provided with no firm grounding.

Another example of the disk recording/reproducing apparatus according to the prior art will be described below.

FIGS. 26, 27, 28, 29, 30 and 31 are schematic configurational diagrams of its optical head according to the prior art and diagrams for describing its operating principle.

FIG. 26 shows an exploded perspective view of the optical head. Reference numeral 109 denotes an integrated unit, part of which is illustrated in FIG. 30. Reference numeral 134 denotes a flexible circuit shown in FIG. 27. FIG. 28 illustrates a state in which the flexible circuit 134 is fitted to the integrated unit 109. FIG. 32(a) shows an exploded perspective view, and (b), an overall perspective view of the optical head.

Herein, reference numeral 101 denotes a silicon substrate; 102, a semiconductor laser fixed over the silicon substrate 101; 3, a multi-divided light detector formed by an IC process over the silicon substrate 101; 104, a radiator plate for holding the silicon substrate 101 in a thermally conductive state via silver paste; 105, a terminal wire-connected from the multi-divided light detector by wire bonding or the like; and 106, a resin package for holding the silicon substrate 101, the radiator plate 104 and the terminal 105.

FIG. 31 shows the optical configuration of the optical head. Reference numeral 107 denotes a hologram element (diffraction grating) formed of resin; and 108, a composite element composed of a beam splitter 108a, a folded mirror 108b and a polarizing-separating element 108c.

What is integrally configured of the elements denoted by 101 through 108 above is defined to be the integrated unit 109.

Reference numeral 110 denotes a reflector mirror; 111, an objective lens fixed to an objective lens holder 112; 113, a photomagnetic recording medium having a magneto-optic effect; 114, an objective lens drive unit for driving the objective lens in the focusing and radial directions of the photomagnetic recording medium 113; and 115, a base constituting a component element of the objective lens drive unit 114. The objective lens drive unit consists of parts denoted by 111, 112 and 115.

Reference numeral 116 denotes a metallic optical bench; 117, a light spot, formed on the multi-divided light detector 103, for detecting a focusing error signal; 118, a light spot, formed on the multi-divided light detector 103, for detecting a tracking error signal; 119, a main beam (P polarized light) formed on the multi-divided light detector 103; 120, a main beam (S polarized light) formed on the multi-divided light detector 103; 121, a focusing error signal light receiving area; 122 and 123, tracking error signal light receiving areas; 124, an information signal light receiving area; 125, a subtractor; 126, an adder; 127 and 128, focuses of the focusing error signal detecting light spot; 130, a light spot formed on the photomagnetic recording medium 113; 131, an adhesive; 132, a radiator plate; 133, optical head cover; 134, a flexible circuit; and 129, a radiator hole for inserting a radiator plate 132 configured in the flexible circuit 134.

The reflector mirror 110 is fixed to the optical bench 116. The terminal 105 of the integrated unit 109 is fixed to the flexible circuit 134 by soldering (the part of the flexible circuit 134 in which a hole 129 is bored as shown in FIG. 27 is folded downward as shown in FIG. 28(a); the radiator plate 132 is fitted into a space S formed by that folding; and a plate spring part which the radiator plate 132 has penetrates the radiator hole 129 to come into contact with the radiator plate 104).

After that, it is inserted into the optical bench 116, and both ends of the radiator plate 132 are fixed to the optical bench 116 as illustrated in FIG. 10.

In this way, it is tacked by the application of a preload by the radiator plate 132 in the Z direction (the direction of the optical axis), and the fixing of the optical bench 116 and the resin package 106 by adhesion results in fitting and fixing of the integrated unit 109 into the optical bench 116.

As a result, the dimensions of the optical bench 116 are so determined that the light receiving surface of the multi-divided light detector 103 be positioned between the focuses 127 and 128 of the light spot in the Z direction (the direction of the optical axis).

On the other hand, the semiconductor laser 102 is fixed to the silicon substrate 101 in a thermally conductive state by soldering or otherwise and wire-connected onto the multi-divided light detector 103 by wire bonding.

The multi-divided light detector 103 is fixed to the radiator plate 104 in a thermally conductive state via silver paste, and heat generated by the semiconductor laser 102 is transmissive to the radiator plate 104 via the silicon substrate 101. The multi-divided light detector 103 and the terminal 105 are wire-connected by wire bonding, and the terminal 105 is soldered onto the solder part of the flexible circuit 134.

Heat accompanying the light generation of the semiconductor laser 102 is transmitted to the radiator plate 132, which is in contact with the radiator plate 104, and radiated by the metallic optical bench 116.

The operation of the example of the prior art configured as described above will be explained below.

Light emitted from the semiconductor laser 102 is reflected by an edged mirror (reflector mirror) formed over the multi-divided light detector 103 by etching or otherwise with its optical axis varied by 90 degrees. The light reflected by the edged mirror is separated into a plurality of different luminous fluxes by the hologram element 107.

The plurality of different luminous fluxes are transmitted by the beam splitter 108a of the composite element 108, reflected by the reflector mirror 110, and condensed by the objective lens 111 fixed to the objective lens holder 112 into the light spot 130 of about 1 micron in diameter on the photomagnetic recording medium 113.

A luminous flux reflected by the beam splitter 108a of the composite element 108 comes into incidence on a light receiving element for laser monitoring (not shown) to control the drive current for the semiconductor laser 102.

The light reflected from the photomagnetic recording medium 113 travels over a reverse route, is reflected and separated by the beam splitter 108a of the composite element 108, comes into incidence on the folded mirror 108b and the polarizing-separating element 108c, separated into mutually orthogonal luminous fluxes having two polarized light components, and comes into incidence on the information signal light receiving area 124.

Out of the reflected light from the photomagnetic recording medium, the luminous flux transmitted by the beam splitter 108a is separated into a plurality of different luminous fluxes by the hologram element 107, and condensed into the focusing error signal light receiving area 121 and the tracking error signal light receiving areas 122 and 123. Focus servo is accomplished by the so-called SSD method, and tracking servo, by the so-called push-pull method.

Further, by computing the difference between the main beam 119 consisting of the P polarized light and the main beam 120 consisting of the S polarized light, it is made possible to detect photomagnetic disk information signals by a differential detecting method. Further by adding them, detection of prepit signals is made possible.

In the optical head configured as described above, in order to obtain desired detection signals with the reflected light from the photomagnetic recording medium 12, the relative positions of the semiconductor laser 102, the objective lens 111 and the multi-divided light detector 103 are adjusted at the time of assembly. Referring to FIGS. 32(a) and (b), the adjustment of the focusing error signal and the tracking error signal is accomplished by shifting the objective lens drive unit 114 in the Y and x directions while holding the base 115 with an external jig (not shown) so as to adjust the outputs of the tracking error signal light receiving areas 122 and 123 to be substantially equal.

This adjustment eventually serves to align the center of the objective lens 111 with respect to the center of the light emitting axis of the semiconductor laser 102 as shown in FIG. 26.

On the other hand, the adjustment of the relative inclinations of the photomagnetic recording medium 113 and the objective lens 111 is accomplished by carrying out skew adjustment θR in the radial direction (around the Y axis) and skew adjustment θT in the tangential direction (around the X axis) while holding the base 115 with an external jig (not shown). After these adjustments, with the adjustment kept as it is, the base 115 is adhered and fixed to the optical bench 116 using the adhesive 131.

In the foregoing way, the focusing error signal and the tracking error signal are adjusted, and skews are adjusted, and four points are adhered and fixed to complete the optical head.

In the above-described configuration according to the prior art, however, as the radiator plate 132 is in contact with the radiator plate 104 by having its plate spring part penetrate the hole 129, it is difficult to achieve high-precision interplanar contact between the radiator plate 132 and the radiator plate 104.

As a consequence, even if the optical bench 116 is made of metal, the contact is only point to point or line to line, resulting in serious deterioration in heat transfer efficiency and heat radiation efficiency. The prior art therefore involves the problem that, where an even more powerful laser is used, heat radiation performance is insufficient if heat radiation uses only the optical bench 116 which enhances the heat transfer efficiency of the radiator plate 132 and the radiator plate 104.

Or where the optical bench 116 is made of resin, as the heat generated by the semiconductor laser 102 when it emits light is radiated only by the radiator plate 132 via the silicon substrate 101 and the radiator plate 104, both the heat transfer efficiency and the heat radiation efficiency are extremely poor, inviting a temperature rise in the semiconductor laser 102 itself, resulting in the problem that the drive current increases, the recording/reproduction time is seriously deteriorated by an increase in current consumption under drive by a battery, and it is made difficult to save the power consumption of the optical head.

DISCLOSURE OF THE INVENTION

The present invention is intended, in view of the above-described problems with the prior art, to provide an optical head capable of substantially enhancing heat radiation efficiency.

One aspect of the present invention is an optical head comprising:
a light source for emitting luminous energy recordable on a recording medium,
a heat radiating section, in contact with said light source, for radiating heat which accompanies the light emission thereof, and
a resin-made bench for mounting and fixing said elements.

This has an effect to enable the heat generated by the light source to escape from the heat radiating section in contact with the light source, to restrain the temperature rise of the light source, thereby extending the service life of the semiconductor laser and at the same time, through the lowering of the semiconductor laser temperature, to reduce the operating current and accordingly the power consumption.

Another aspect of the present invention is the optical head as described above, characterized in that said resin-made bench and said heat radiating section are formed by integral molding, and a part of said heat radiating section is exposed to space.

This enables the heat generated by the light source to escape from the heat radiating section in contact with the light source, to restrain the temperature rise of the light source, thereby extending the service life of the semiconductor laser and at the same time, through the lowering of the semiconductor laser temperature, to reduce the operating current and accordingly the power consumption. Also, its integrated formation has another effect to facilitate the packaging work.

Still another aspect of the present invention is the optical head as described above, characterized in that a threaded part is formed in said heat radiating section, one end of said heat radiating section is in contact with the back surface of said light source, tightening by said threaded part causes the end of said heat radiating section to support said light source, and
a part of said heat radiating section is exposed to space.

This has an energizing effect to fix the light receiving/emitting element from behind and at the same time a heat radiating effect.

Yet another aspect of the present invention is the optical head as described above, characterized in that one end of said heat radiating section is in contact with the back surface of said light source and the other end of same has a guide section which is in contact with a shaft supporting said optical head.

This enables the heat generated by the light source to escape from the heat radiating section to a shaft, further gives a heat radiating effect, thereby making it possible to extend the service life of the semiconductor laser and at the same time to reduce the operating current and accordingly the power consumption. Furthermore, the ground of the light source is dropped to the shaft through the heat radiating section to give firm grounding, thereby exerting an effect against unnecessary radiation.

Still yet another aspect of the present invention is the optical head as described above, characterized in that one end of said heat radiating section is in contact with the back surface of said light source and the other end of same has a spring section for suppressing a shaft supporting said optical head.

This makes it possible to eliminate the play of the resin-made bench and the shaft, resulting in an effect to ensure stable operation even in an environment where there is much vibration, such as when mounted on a vehicle.

A further aspect of the present invention is the optical head as described above, characterized in that one end of said heat radiating section is in contact with the back surface of said light source and the other end of same has an engaging section which engages with a threaded shaft for supporting and shifting said optical head.

As this results in combined use by the heat radiating section of a member engaging with the shaft, there is an effect to help reduce the number of parts.

A still further aspect of the present invention is an optical head comprising:
a light source for emitting luminous energy recordable on a recording medium, a heat radiating section, in contact with said light source, for radiating heat which accompanies the light emission thereof, a resin-made bench for mounting and fixing the aforementioned elements, and a magnetic head mechanism for applying magnetic field-modulation signals, wherein one of said heat radiating section is in contact with the back surface of light source and the other of same is in contact with a metallic member of said magnetic head mechanism.

This provides a head radiation effect by letting the heat escape from the heat radiating section to the magnetic head, thereby making it possible to extend the service life of the semiconductor laser and at the same time to reduce the operating current and accordingly the power consumption.

Another aspect of the present invention is an optical head comprising a light source for generating luminous energy required for recording on a disk-shaped information recording medium or reproducing information recorded on said disk-shaped information recording medium; a radiator plate, in contact with said light source either directly or indirectly, for guiding heat which accompanies the emission of light by said light source; an objective lens which is means for focusing light on said disk-shaped information recording medium; an objective lens drive unit for driving said objective lens in the focal and radial directions of said disk-shaped information recording medium; a light receiving element for receiving light reflected from said disk-shaped information recording medium; a sheet-shaped flexible circuit for feeding power to said light source and said light receiving element and communicating signals from said light receiving element; and an optical bench holding at least said light source, said objective lens drive unit, said radiator plate and said light receiving element, wherein:

said radiator plate is brought into contact with a heat transfer section provided in said flexible circuit and, by causing said flexible circuit to guide heat from said radiator plate, heat generated by said light source is radiated through said flexible circuit and said radiator plate.

Further, another aspect of the present invention is an optical head comprising a light source for generating luminous energy required for recording on a disk-shaped information recording medium or reproducing information recorded on said disk-shaped information recording medium; a radiator plate, in contact with said light source either directly or indirectly, for guiding heat which accompanies the emission of light by said light source; an objective lens which is means for focusing light on said disk-shaped information recording medium; an objective lens drive unit for driving said objective lens in the focal and radial direction of said disk-shaped information recording medium; a light receiving element for receiving light reflected from said disk-shaped information recording medium; a sheet-shaped flexible circuit for feeding power and communicating signals to said light source and said light receiving element; a thermally conductive heat transfer member; an optical bench for holding at least said light source, said objective lens drive unit, said radiator plate, said light receiving element and said heat transfer member; and a thermally conductive optical head cover fixed to said optical bench, wherein:

said radiator plate and said heat transfer member are brought into contact with each other, said heat transfer member is caused to guide heat from said radiator plate and, by bringing into contact said heat transfer member and said optical head cover with each other, heat generated by said light source is radiated by said light source through said optical head cover, said heat transfer member and said radiator plate.

Further, another aspect of the present invention is an optical head comprising a light source for generating luminous energy required for recording on a disk-shaped information recording medium or reproducing information recorded on said disk-shaped information recording medium; a heat radiating section, in contact with said light source, for guiding heat which accompanies the emission of light by said light source; an objective lens which is means for focusing light on said disk-shaped information recording medium; an objective lens drive unit for driving said objective lens in the focal and radial direction of said disk-shaped information recording medium; a light receiving element for receiving light reflected from said disk-shaped information recording medium; a sheet-shaped flexible circuit for feeding power to said light source and said light receiving element and communicating signals from said light receiving element; a thermally conductive heat transfer member; an optical bench for holding at least said light source, said objective lens drive unit, and said heat transfer member, said radiator plate and said light receiving element; and a thermally conductive optical head cover fixed to said optical bench, wherein:

said radiator plate is brought into contact with a heat transfer section provided in said flexible circuit to cause said flexible circuit to guide heat from said radiator plate; heat generated by said light source is radiated through said optical head cover, said flexible circuit and said radiator plate by bringing into contact said the heat transfer section of said flexible circuit and said optical head cover with each other; said radiator plate and said heat transfer member are brought into contact with each to cause said heat transfer member to guide heat from said radiator plate; and by bringing into contact said heat transfer member and said optical head cover with each other, heat generated by said light source is radiated through said optical head cover and said heat transfer member.

Further, another aspect of the present invention is an optical head feed apparatus for feeding an optical head, said optical head having a light source for generating luminous energy required for recording on a disk-shaped information recording medium or reproducing information recorded on said disk-shaped information recording medium; a radiator plate, in contact with said light source either directly or indirectly, for guiding heat which accompanies the emission of light by said light source; a light receiving element for receiving light reflected from said disk-shaped information recording medium; a sheet-shaped flexible circuit for feeding power to said light source and said light receiving element and communicating signals from said light receiving element; an optical bench for holding at least said light source, said radiator plate and said light receiving element; and a thermally conductive optical head cover fixed to said optical bench, in which said radiator plate and the heat transfer member provided in said flexible circuit are brought into contact with each other, said flexible circuit is caused to guide heat from said radiator plate and, by bringing into contact the heat transfer member of said flexible circuit and said optical head cover with each other, heat generated by said light source is radiated through said light source through said optical head cover, said flexible circuit and said radiator plate, characterized in that said optical head feed apparatus comprises a feed nut fixed to said optical head cover and having thermal conductivity; and a thermally conductive feed screw, fitted into said feed nut, for driving said optical head by rotating in the radial direction of said disk-shaped information recording medium, and said optical head cover and said feed nut are either integrally configured or brought into contact with each other in a thermally conductive state thereby to transfer heat generated by said light source and transferred to said optical head cover to said feed screw through said feed nut and to radiate it.

Further, another aspect of the present invention is an optical head feed apparatus for feeding an optical head, said optical head having a light source for generating luminous energy required for recording on a disk-shaped information recording medium or reproducing information recorded on said disk-shaped information recording medium; a radiator plate, in contact with said light source either directly or indirectly, for guiding heat which accompanies the emission of light by said light source; an objective lens which is means for focusing light on said disk-shaped information recording medium; an objective lens drive unit for driving said objective lens in the focal and radial direction of said disk-shaped information recording medium; a light receiving element for receiving light reflected from said disk-shaped information recording medium; a sheet-shaped flexible circuit for feeding power and communicating signals to said light source and said light receiving element; a thermally conductive heat transfer member; an optical bench for holding at least said light source, said objective lens drive unit, said radiator plate, said light receiving element and said heat transfer member; and a thermally conductive optical head cover fixed to said optical bench, said radiator plate and said heat transfer member are brought into contact with each other, said heat transfer member is caused to guide heat from said radiator plate and, by bringing into contact said heat transfer member and said optical head cover with each other, heat generated by said light source is radiated by said light source through said optical head cover, said heat transfer member and said radiator plate, characterized in that said optical head feed apparatus comprises a feed nut fixed to said optical head cover and having thermal conductivity; and a thermally conductive feed screw, fitted into said feed nut, for driving said optical head by rotating in the radial direction of said disk-shaped information recording medium, and said optical head cover and said feed nut are either integrally configured or brought into contact with each other in a thermally conductive state thereby to transfer heat generated by said light source and transferred to said optical head cover to said feed screw through said feed nut and to radiate it.

Further, another aspect of the present invention is an, optical head feed apparatus for feeding an optical head, said optical head having a light source for generating luminous energy required for recording on a disk-shaped information recording medium or reproducing information recorded on said disk-shaped information recording medium; a radiator plate, in contact with said light source either directly or indirectly, for guiding heat which accompanies the emission of light by said light source; an objective lens which is means for focusing light on said disk-shaped information recording medium; an objective lens drive unit for driving said objective lens in the focal and radial direction of said disk-shaped information recording medium; a light receiving element for receiving light reflected from said disk-shaped information recording medium; a sheet-shaped flexible circuit for feeding power and communicating signals to said light source and said light receiving element; a thermally conductive heat transfer member; and an optical bench for holding at least said light source, said objective lens drive unit, said radiator plate, said light receiving element and said heat transfer member, characterized in that said optical head feed apparatus comprises a thermally conductive feed nut; and a thermally conductive feed screw, fitted into said feed nut, for driving said optical head by rotating in the radial direction of said disk-shaped information recording medium, and said heat transfer member and said feed nut are either integrally configured or brought into contact with each other in a thermally conductive state thereby to transfer heat generated by said light source and transferred to said heat transfer member to said feed screw through said feed nut and to radiate it.

BRIEF DESCRIPTION OF DRAWINGS

FIG. 31 consists of schematic diagrams showing the optical configuration of the optical head according to the prior art.

DESCRIPTION OF SYMBOLS

Figure 1:
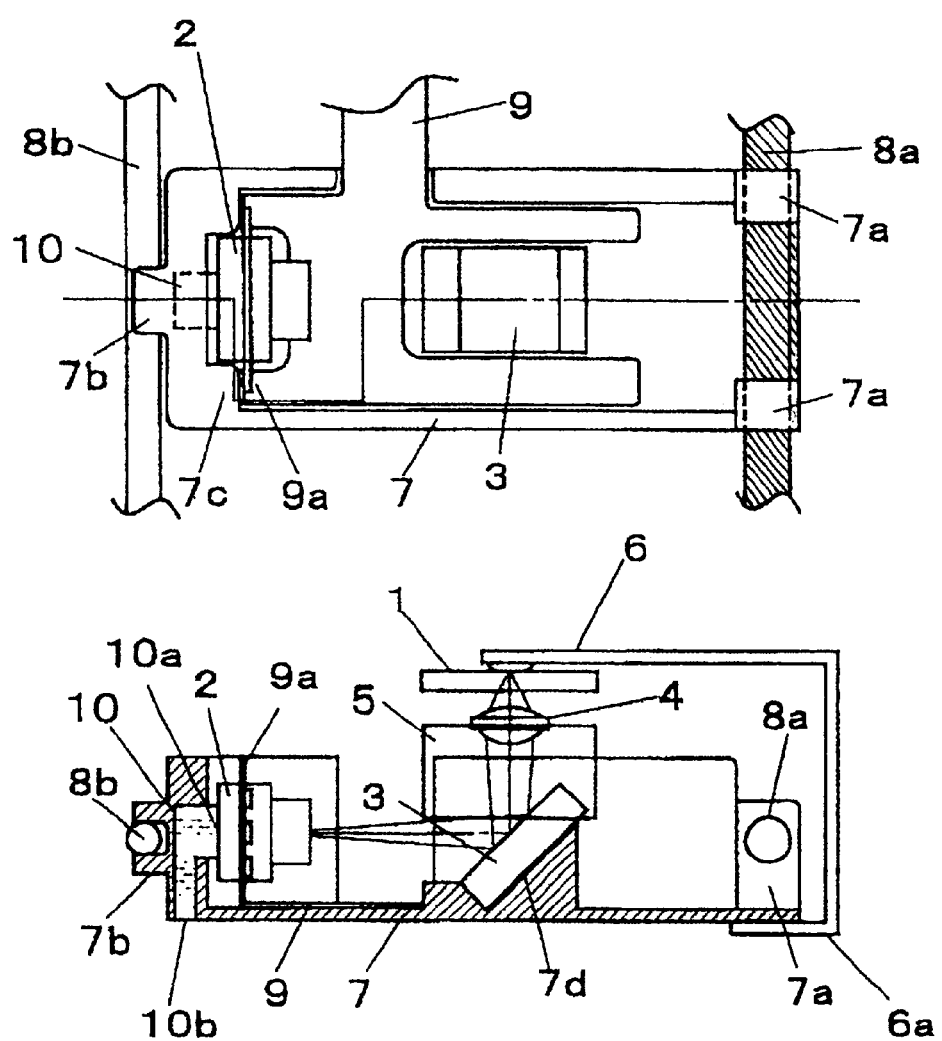
FIG. 1 is a schematic view of an optical head according to Embodiment 1-1 of the present invention.

1 Optical disk
2 Light receiving/emitting element
3 Mirror
4 Objective lens
5 Objective lens actuator
6 Magnetic head
7 Resin-made bench
7a, 7b Reference sections a and b of resin-made bench 7
7c Light receiving/emitting element fixing section of resin-made bench 7
7d Mirror fixing section of resin-made bench 7
8a, 8b Shafts
9 Flexible wiring board
10, 12 Radiator blocks
13, 14, 15 Radiator spring
11 Radiator screw
10a, 12a, 13a, 14a, 15a Contacting sections
10b Heat radiating section
12b Guide section
13b Spring section
14b Engaging section
15b Fixing section
101 Silicon substrate
102 Semiconductor laser
103 Multi-divided light detector
104 Radiator plate
105 Terminal
106 Resin package
107 Hologram element
108 Composite element
108a Beam splitter
108b Folded mirror
108c Polarizing-separating element
109 Integrated unit
110 Reflector mirror
111 Objective lens
112 Objective lens holder
113 Photomagnetic recording medium
114 Objective lens drive unit
115 Base
116 Optical bench
117, 118 Light spot
119 Main beam (P polarized light)
120 Main beam (S polarized light)
121 Focusing error signal light receiving area
122, 123 Tracking error signal light receiving area
124 Information signal light receiving area
125 Subtractor
126 Adder
127, 128 Focuses of light spot
129 Radiator hole
130 Light spot
131 Adhesive
132 Radiator plate
133 Optical head cover
134 Flexible circuit
135 Heat transfer section A
136 Heat transfer section B
137 Heat transfer line
138 Contact section
139 GND potential part
140 Heat transmissive material
141 GND line
142 Heat transfer terminal
143 Feed nut
144 Fitting section
145 Feed screw
146 Bearing
147 Mechanism chassis

BEST MODE FOR CARRYING OUT THE INVENTION

Embodiments of the present invention will be described below with reference to drawings.

Embodiment 1-1

The configuration and operation of Embodiment 1-1 of the invention will be described below with reference to a plan and a sectional view in FIG. 1.

In FIG. 1, reference numeral 1 denotes an optical disk (not shown in the plan); 2, a light receiving/emitting element configured as a single device mounted with a semiconductor laser chip, which is a light emitting section for emitting a laser beam inside as well as an optical signal detecting section for receiving a beam resulting from the reflection of this laser beam from the optical disk 1 and detecting various information signals; and 3, a mirror for letting the laser beam from the light receiving/emitting element 2 to the optical disk 1.

Reference numeral 4 denotes an objective lens (not shown in the plan) for focusing the laser beam reflected by the mirror 3 on the optical disk 1 and forming a minute light spot; and 5, an objective lens actuator (not shown in the plan) for letting the objective lens 4 comply with any eccentricity and/or surface oscillation of the optical disk 1.

Reference numeral 6 denotes a magnetic head (not shown in the plan) for applying, where the optical disk 1 is a recordable disk, a modulating magnetic field to realize so-called magnetic field-modulated recording; 6a, a fitting section for fixing the magnetic head 6 to a resin-made bench 7; 7, a resin-made bench on which these parts are mounted; 7a and 7b, reference sections into which shafts 8a and 8b are to be inserted, respectively; 7c, a light receiving/emitting element fixing section to which the light receiving/emitting element 2 is to be fixed; and 7d, a mirror fixing section to which the mirror 3 is to be fixed.

Reference numeral 9 denotes a flexible wiring board to be connected to an external circuit (not shown). To this board, the light receiving/emitting element 2 having a light emitting section and an optical signal detecting section for causing a semiconductor laser to emit light and detecting information signals from the optical disk 1 is electrically connected in a position 9b by soldering a wire or otherwise. Further, the flexible wiring board 9 is mounted with a high-frequency superimposing circuit (not shown) for reducing noise due to returning light from the optical disk 1.

Reference numeral 10 denotes a radiator block made of a material having a high heat conductivity, such as metal, which has such a configuration that it is in contact with the back side of the light receiving/emitting element 2 by its contacting section 10a and in contact with air by a heat radiating section 10b at the other end, and is formed integrally with the resin-made bench 7.

In the optical head configured of parts mounted on the resin-made bench 7 as described above, power feed from the flexible wiring board 9 causes the light receiving/emitting element 2 to emit a laser beam and, similarly, power feed from the flexible wiring board 9 drives the objective lens actuator 5 to cause the objective lens 4 to form a minute light spot in a prescribed position on the optical disk 1.

Where a read only optical disk 1 is to be played back, the magnetic head 6 does not operate, and the light receiving/emitting element 2 detects the so-called reflected luminous energy from the optical disk 1. Where a recordable optical disk 1 is used, the light receiving/emitting element 2 emits optical power of a certain intensity during recording, and carries out so-called magnetic field-modulated recording with modulated signals from the magnetic head 6.

During reproduction, the magnetic head 6 does not operate, and the light receiving/emitting element 2 implements reproduction by detecting the rotation of the polarized light surface from the optical disk 1. The heat of the light receiving/emitting element 2 generated by light emission is radiated from the heat radiating section 10b via the radiator block 10 in contact with its back surface.

Figure 8:
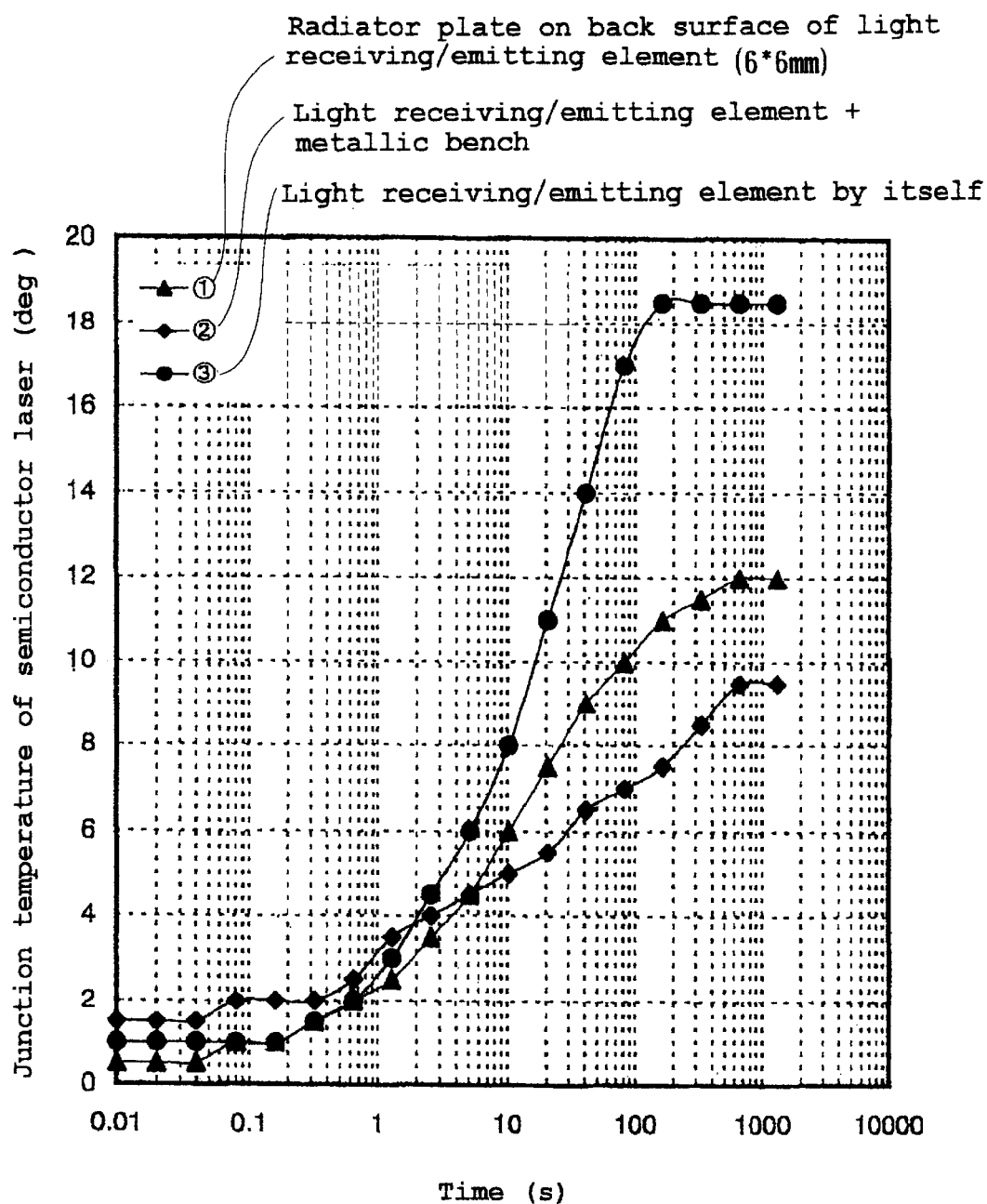
FIG. 8 is a graph of the junction temperature in a semiconductor laser.

Regarding the heat radiating effect, ① in FIG. 8 shows variations in the junction temperature of the semiconductor laser. Thus ① indicates the junction temperature at the time the radiator plate (6 mm×6 mm) is brought into contact with the back surface of the light receiving/emitting element in this embodiment. This graph reveals the excellent heat radiating effect of this embodiment.

As described above, according to this embodiment, even if the resin-made bench 7 is made of a material poor in heat conductivity, the integrally formed radiator block 10 can accomplish satisfactory heat radiation, resulting in an optical head capable of restraining the temperature rise of the semiconductor laser, thereby extending the service life of the semiconductor laser and at the same time, through the lowering of the semiconductor laser temperature, to reduce the operating current and accordingly the power consumption.

Embodiment 1-2

The configuration and operation of Embodiment 1-2 of the invention will be described below with reference to a plan and a sectional view in FIG. 2.

Figure 2:
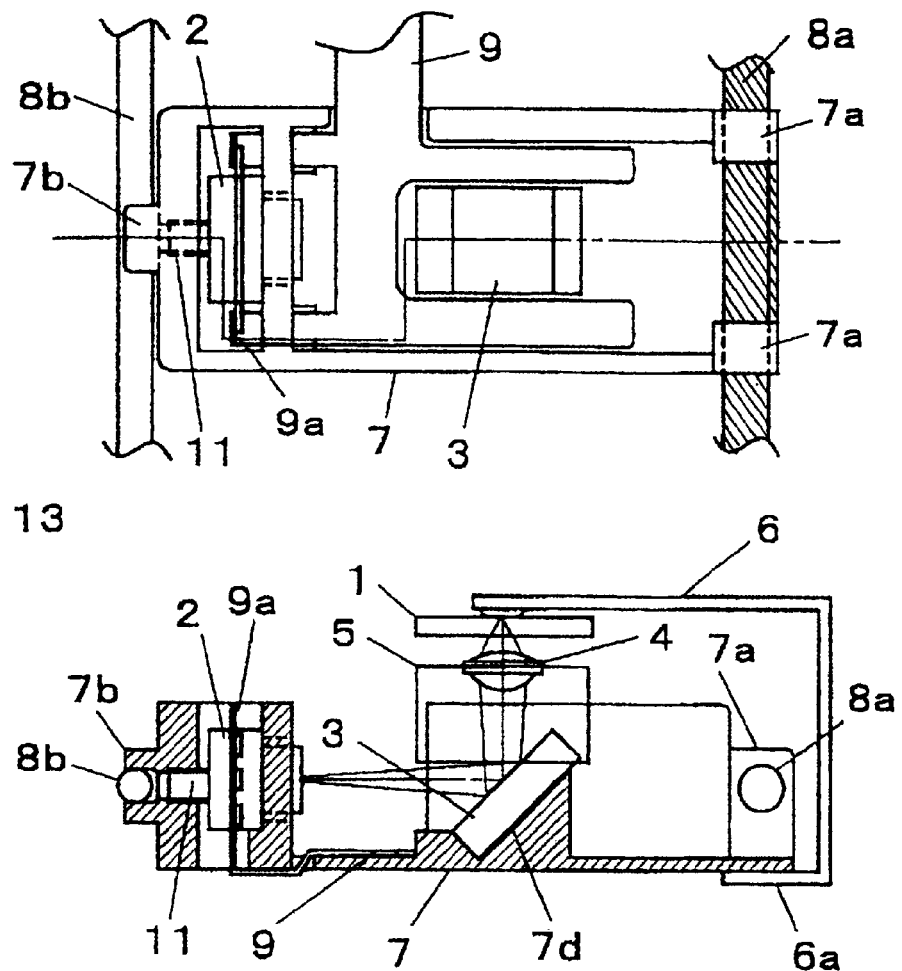
FIG. 2 is a schematic view of an optical head according to Embodiment 1-2 of the invention.

In FIG. 2, all the constituents denoted by reference numerals 1 through 9, including those having suffixes, are the same as their respective counterparts in FIG. 1, and their functions and operations are also the same.

The difference from FIG. 1 is that, instead of the radiator block 10 in contact with the light receiving/emitting element 2, a radiator screw 11 is brought into contact.

Also, as in Embodiment 1-1, the flexible wiring board 9 is mounted with a high-frequency superimposing circuit (not shown) to reduce noise due to returning light from the optical disk 1.

As described above, according to this embodiment, in addition to the excellent advantages described in respect of Embodiment 1-1, the screw can apply pressure to the resin-made bench 7 and the heat radiating section can be configured at low cost.

Embodiment 1-3

The configuration and operation of Embodiment 1-3 of the invention will be described below with reference to a plan and a sectional view in FIG. 3.

Figure 3:
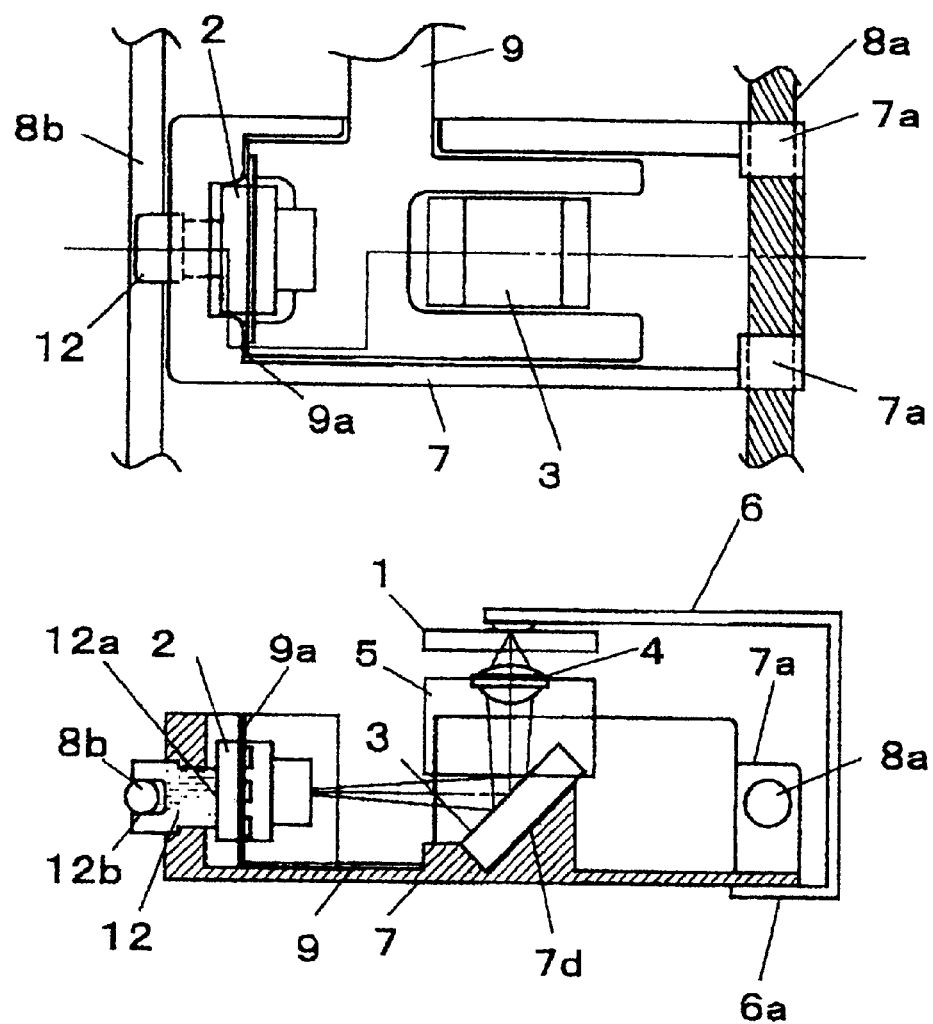
FIG. 3 is a schematic view of an optical head according to Embodiment 1-3 of the invention.

In FIG. 3, all the constituents denoted by reference numerals 1 through 9, including those having suffixes, are the same as their respective counterparts in FIG. 1, and their functions and operations are also the same.

The difference from FIG. 1 is that, instead of the radiator block 10 in contact with the light receiving/emitting element 2, there is used a radiator block 12 having a configuration in which a contacting section 12a is brought into contact with the back surface of the light receiving/emitting element 2 and a guide section 12b bears the shaft 8b.

Also, as in Embodiment 1-1, the flexible wiring board 9 is mounted with a high-frequency superimposing circuit (not shown) to reduce noise due to returning light from the optical disk 1.

As described above, this embodiment, in addition to the excellent advantages described in respect of Embodiment 1-1, has the following advantages.

That is, it is possible to transmit the heat generated in the light receiving/emitting element 2 from its back surface to the radiator block 12 and to radiate it to the shaft 8b, made of a metal having a high heat conductivity, from the guide section 12b, resulting in an optical head even more effective in heat radiation than in Embodiment 1-1 or Embodiment 1-2.

Furthermore, since the back surface part, in contact with the radiator block 12, of the light receiving/emitting element 2 constitutes the ground electrically, this means that the shaft 8b is grounded via the radiator block 12, and accordingly there is provided an optical head that can easily provide against unnecessary radiation from the high-frequency superimposing circuit.

Embodiment 1-4

The configuration and operation of Embodiment 1-4 of the invention will be described below with reference to a plan and a sectional view in FIG. 4.

Figure 4:
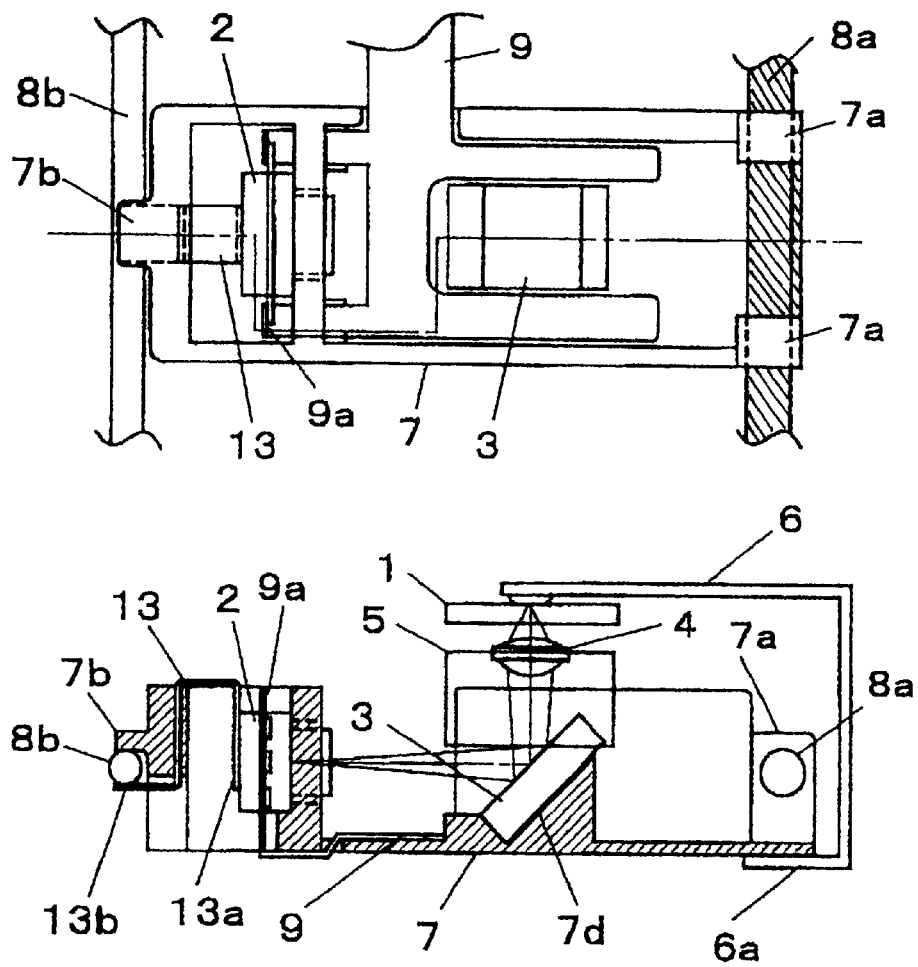
FIG. 4 is a schematic view of an optical head according to Embodiment 1-4 of the invention.

In FIG. 4, all the constituent elements denoted by reference numerals 1 through 9, including those having suffixes, are the same as their respective counterparts in FIG. 1, and their functions and operations are also the same. The difference from FIG. 1 is that, instead of the radiator block 10 in contact with the light receiving/emitting element 2, a radiator spring 13 so configured as to be in contact with the back surface of the light receiving/emitting element 2 by a contacting section 13a and with the shaft 8b by a spring section 13b is used.

Also, as in Embodiment 1-1, the flexible wiring board 9 is mounted with a high-frequency superimposing circuit (not shown) to reduce noise due to returning light from the optical disk 1.

As described above, this embodiment, in addition to the excellent advantages described in respect of Embodiment 1-1, has the following advantages.

Thus, it is possible to transmit the heat generated in the light receiving/emitting element 2 from its back surface to the radiator spring 13 and to radiate it to the shaft 8b, made of a metal having a high heat conductivity, resulting in an optical head even more effective in heat radiation than in Embodiment 1-1 or Embodiment 1-2.

Furthermore, as in Embodiment 1-3, since the shaft 8b can be grounded via the radiator spring 13, there is provided an optical head that can easily provide against unnecessary radiation from the high-frequency superimposing circuit.

Also, it is possible to eliminate play components due to dimensional errors with the spring section 13b of the radiator spring 13, there is provided an optical head highly resistant to vibration.

Embodiment 1-5

The configuration and operation of Embodiment 1-5 of the invention will be described below with reference to a plan and a sectional view in FIG. 5.

Figure 5:
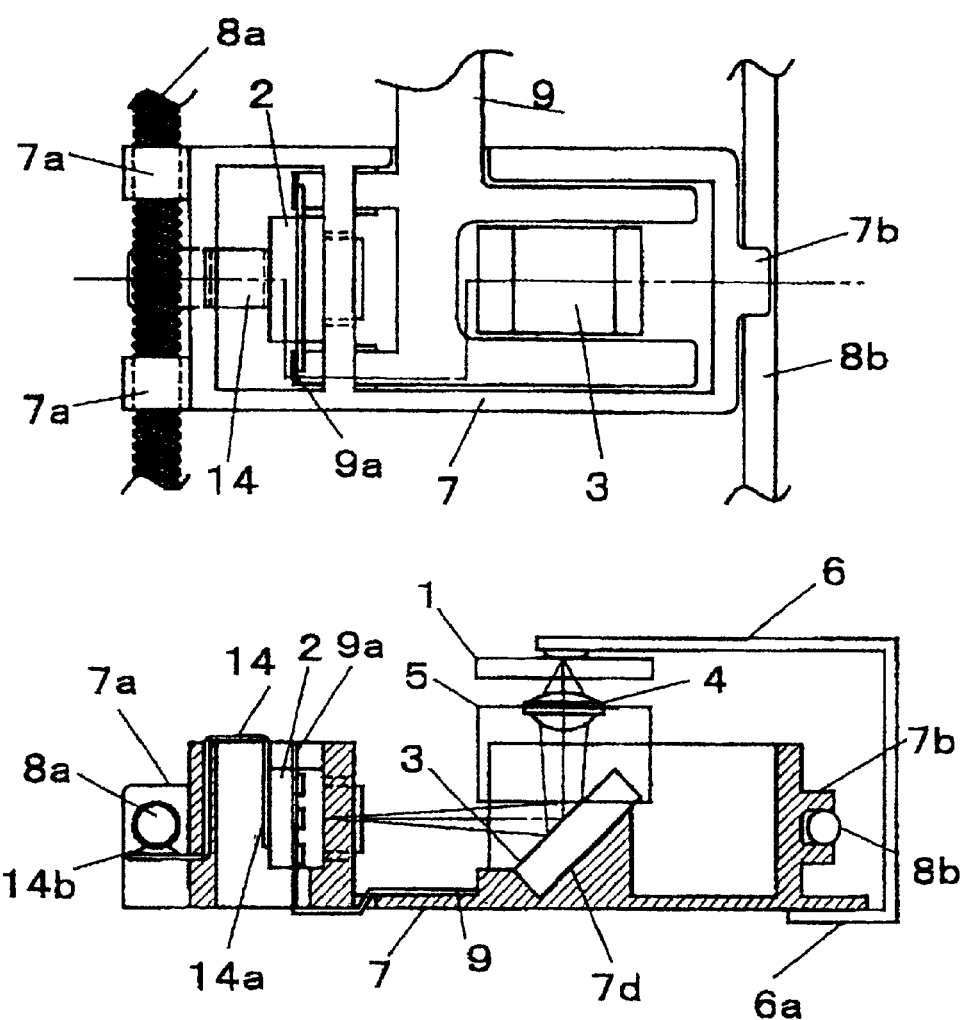
FIG. 5 is a schematic view of an optical head according to Embodiment 1-5 of the invention.

In FIG. 5, all the constituents denoted by reference numerals 1 through 7, 8b and 9, including those having suffixes, are the same as their respective counterparts in FIG. 1, and their functions and operations are also the same.

The differences from FIG. 1 are that a feed screw is formed on the shaft 8a, and that there is used a radiator spring 14 so configured as to be in contact with the back surface of the light receiving/emitting element 2 by the contacting section 14a and to be engaged with the threaded part of the shaft 8a by the engaging section 14b.

Also, as in Embodiment 1-1, the flexible wiring board 9 is mounted with a high-frequency superimposing circuit (not shown) to reduce noise due to returning light from the optical disk 1.

As described above, this embodiment, in addition to the excellent advantages described in respect of Embodiment 1-1, has the following advantages.

Thus, it is possible to transmit the heat generated in the light receiving/emitting element 2 from its back surface to the radiator spring 14 and to radiate it to the shaft 8a, made of a metal having a high heat conductivity, resulting in an optical head even more effective in heat radiation than in Embodiment 1-1 or Embodiment 1-2.

Furthermore, as in Embodiment 1-4, since the shaft 8a can be grounded via the radiator spring 14, there is provided an optical head that can easily provide measures against unnecessary radiation from the high-frequency superimposing circuit.

Also, as an engaging section 14b to convert the rotational force of the shaft 8a into a linear motion is formed on the radiator spring 14, the number of parts, and accordingly the cost, can be reduced by combining with the radiator spring what would usually be configured of another member.

Embodiment 1-6

The configuration and operation of Embodiment 1-6 of the invention will be described below with reference to a plan and a sectional view in FIG. 6.

Figure 6:
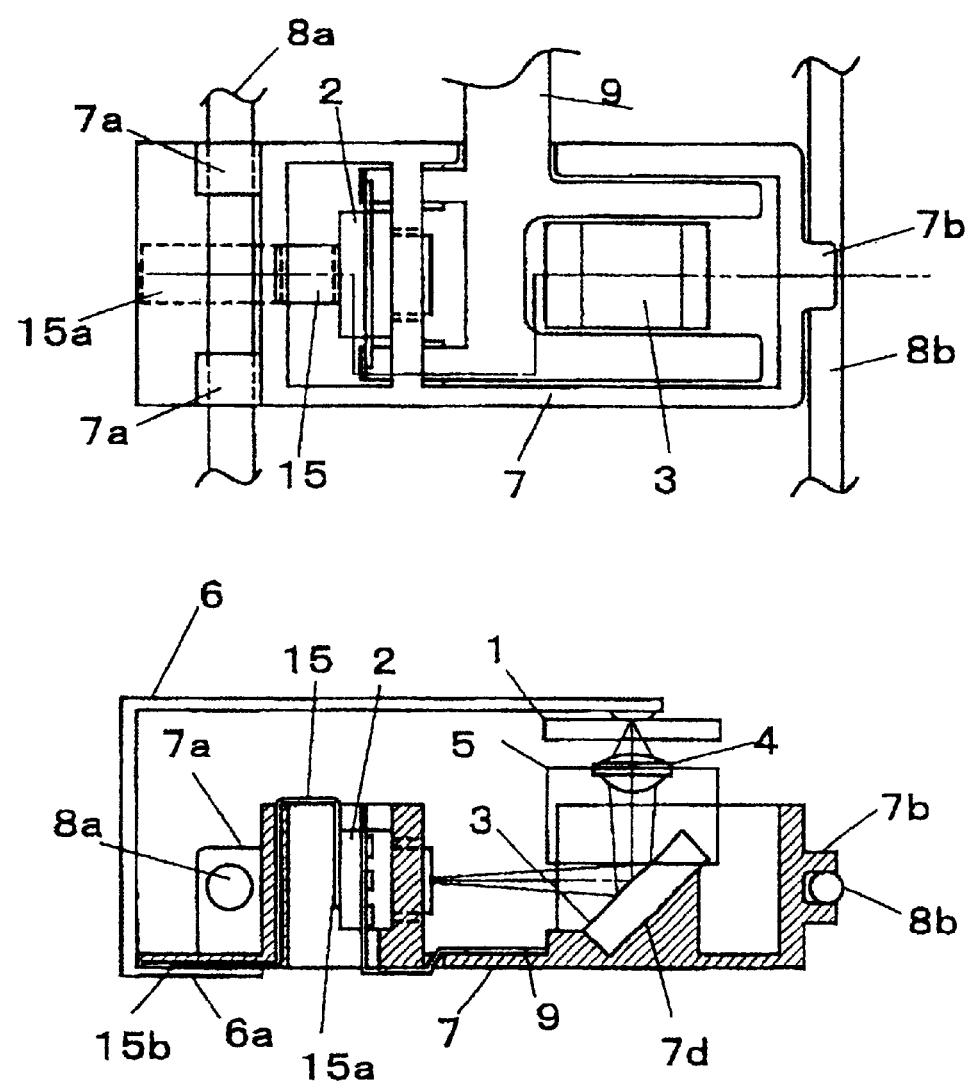
FIG. 6 is a schematic view of an optical head according to Embodiment 1-6 of the invention.
Figure 7:
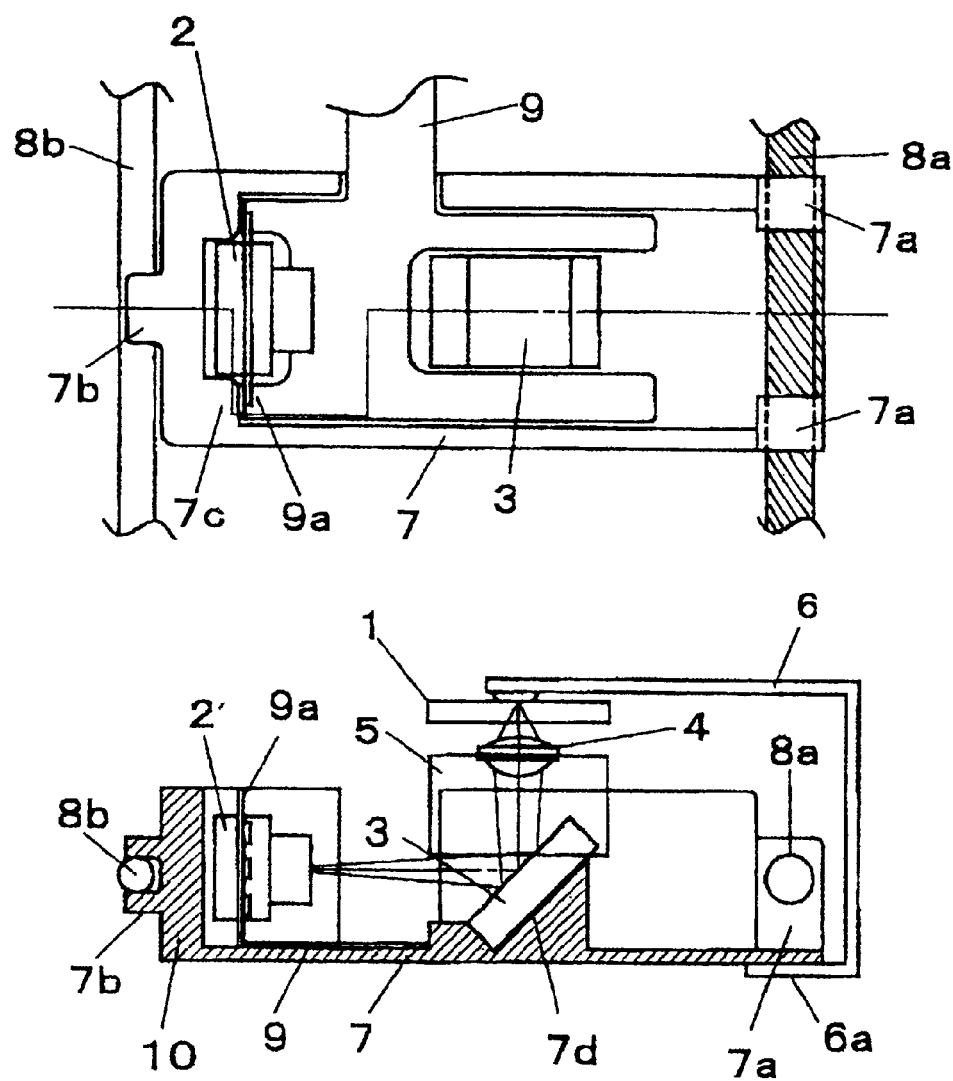
FIG. 7 is a schematic view of an optical head according to the prior art.

In FIG. 6, all the constituents denoted by reference numerals 1 through 9, including those having suffixes, are the same as their respective counterparts in FIG. 1.

The difference from Embodiment 1-1 is that, instead of the radiator block 10 in contact with the light receiving/emitting element 2, there is used a radiator spring 15 which is in contact with the back surface of the light receiving/emitting element 2 by a contacting section 15a and whose fixing section 15b has a part extended to the bottom of the resin-made bench 7 on the shaft 8a side, and this part extended to the bottom is further arranged to be in contact with a metallic fitting section 6a of the mechanism of the magnetic head 6.

In this embodiment, the invention can be applied even in the absence of the objective lens and the objective lens drive unit.

As described above, this embodiment, in addition to the excellent advantages described in respect of Embodiment 1-1, has the following advantages.

Thus, it is possible to transmit the heat generated in the light receiving/emitting element 2 through the radiator spring 15 to the fitting section 6a of the magnetic head 6. This configuration makes it possible to expand the surface area of the heat radiating section.

Incidentally although the magnetic head 6 is present in Embodiments 1-1 through 1-6 because optical heads for magnetic field-modulation type minidisks were taken up as examples, it goes without saying that the invention can also be applied to photomagnetic disk systems which do not perform magnetic field-modulated recording and to recordable optical heads in systems having no magnetic head 6, such as phase change or organic pigment optical disk systems.

Further, though the objective lens actuator 5 is a so-called biaxial actuator and driven in two different axial directions of the focusing direction and the tracking direction in this embodiment, the present invention is not limited to the biaxial actuator.

As described above, according to the invention, the resin-made bench and the heat radiating member are formed by integral molding.

This enables the temperature of the semiconductor laser to be prevented from rising by radiating heat from the radiator block or the radiator spring in contact with the back surface of the light receiving/emitting element either into the air or to the shaft or the magnetic head fitting section, thereby extending the service life of the semiconductor laser and at the same time, through the lowering of the semiconductor laser temperature, to reduce the operating current and accordingly the power consumption.

Furthermore, it is possible to drop grounding to the shaft through the heat radiating section, resulting in an effect to easily provide measures against unnecessary radiation from the high-frequency superimposing circuit.

This makes it possible to improve radiation effectiveness with a resin-made bench with the result that the temperature of the semiconductor laser can be prevented from rising and the service life of the semiconductor laser can be extended. Also, reducing the semiconductor laser temperature also makes it possible to reduce the operating current and accordingly the power consumption.

Furthermore, it is made possible to drop grounding of the semiconductor laser to the shaft through the heat radiating section, resulting in an effect to easily provide measures against unnecessary radiation by obtaining a strong grounding even though a resin-made bench is used.

Next, another aspect of the present invention will be described with reference to drawings.

Embodiment 2-1

Embodiment 2-1 of the invention will be described below with reference to drawings.

Figure 9:
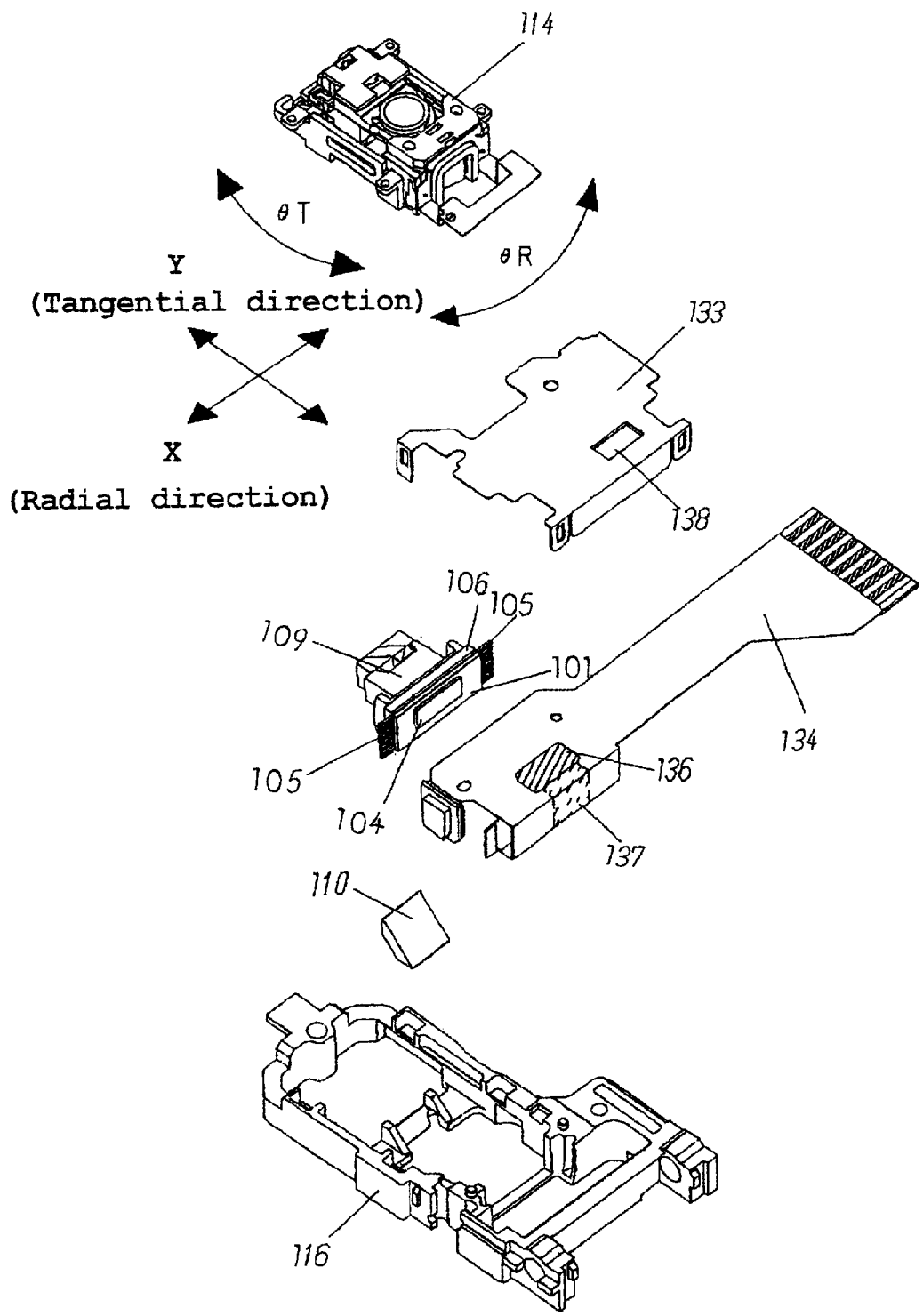
FIG. 9 is a schematic exploded perspective view of the optical head pertaining to Embodiment 2-1 of the invention.
Figure 10:
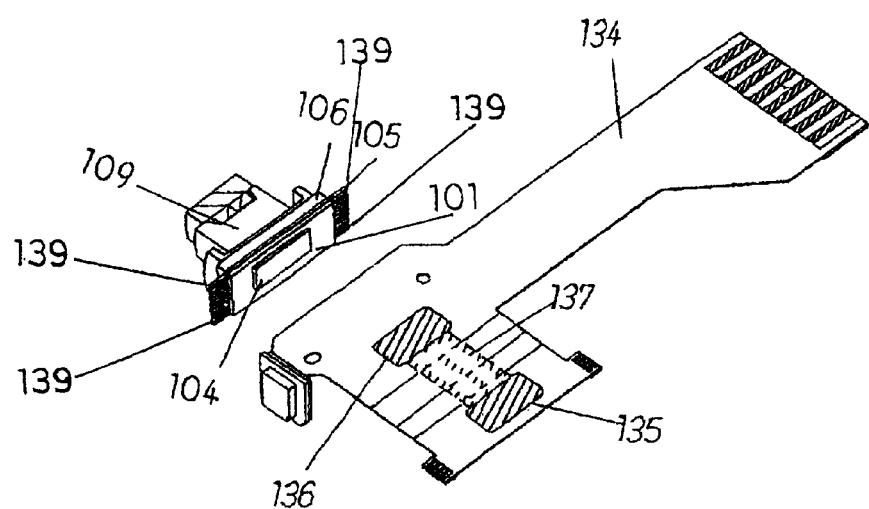
FIG. 10 consists of schematic partial expansion plans of a flexible circuit pertaining to Embodiment 2-1 of the invention.
Figure 10:
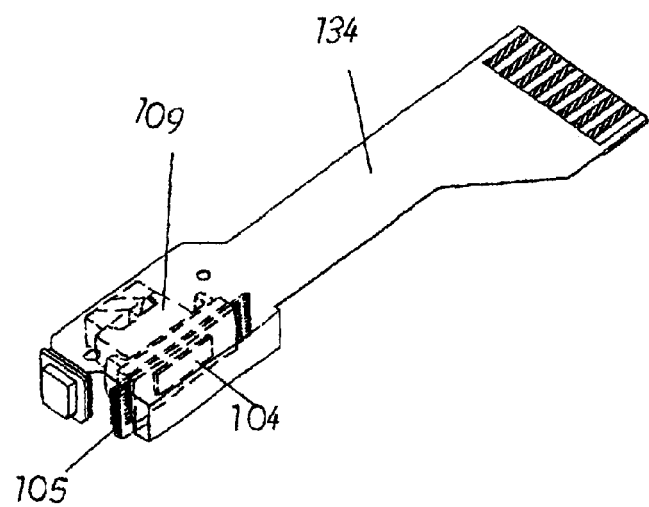
Figure 11:
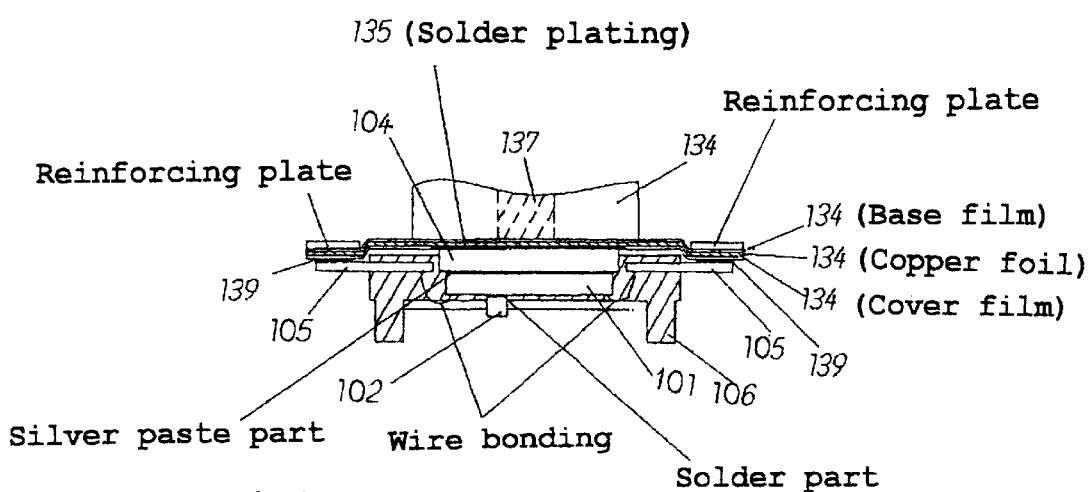
FIG. 11 consists of schematic partial sections of an integrated unit pertaining to Embodiment 2-1 of the invention.
Figure 11:
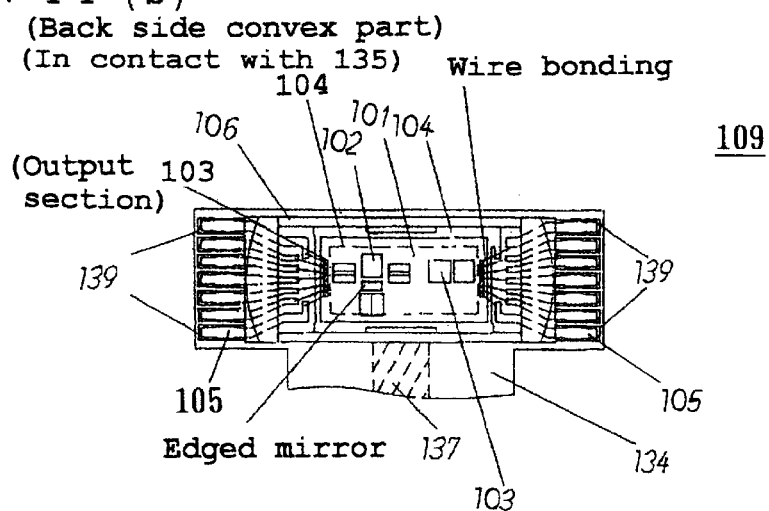
Figure 12:
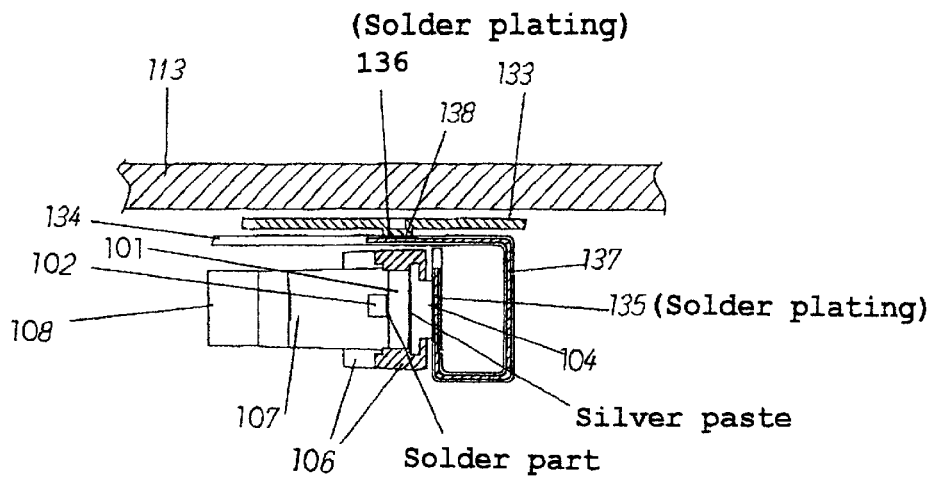
FIG. 12 consists of schematic partial sections of an optical head pertaining to Embodiment 2-1 of the invention.
Figure 12:
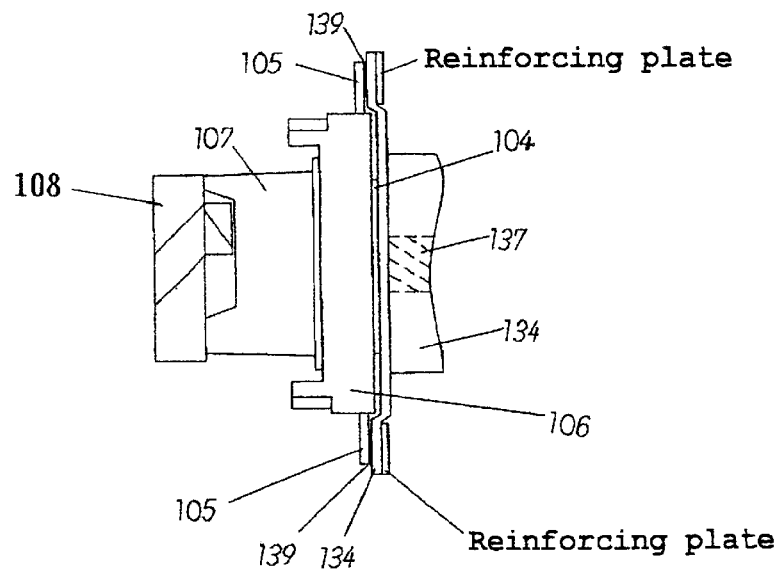
Figure 15A:
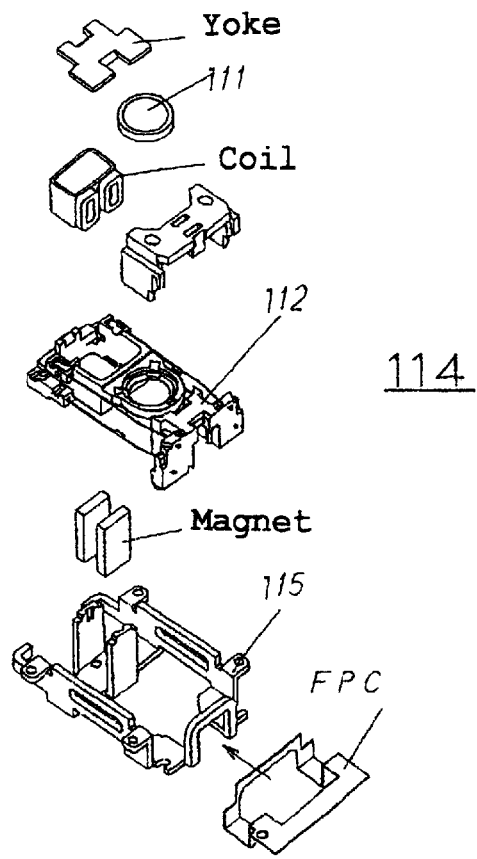
FIG. 15 consists of an exploded perspective view of an objective lens drive unit and a schematic finished view of an optical head pertaining to Embodiment 2-1 of the invention.
Figure 15B:
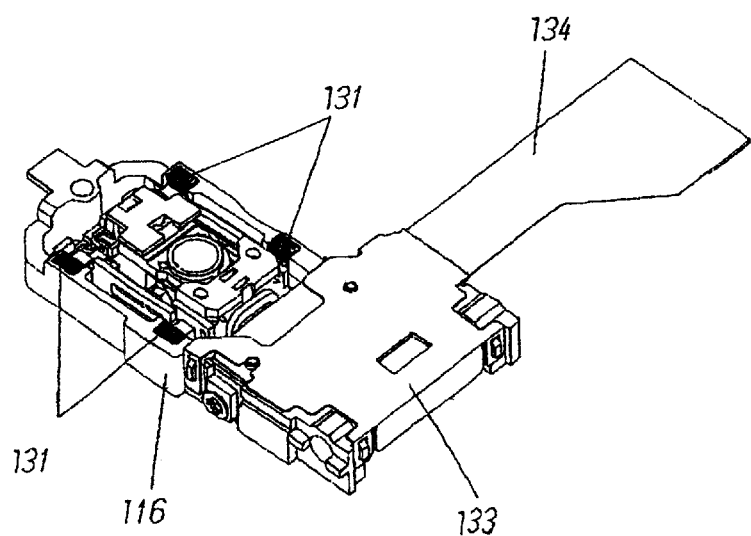

FIG. 9 is an exploded perspective view of the optical head, wherein reference numeral 109 denotes an integrated unit, and FIG. 11 shows a part of it. Reference numeral 134 denotes a flexible circuit shown in FIG. 10. To add, FIG. 12 illustrates a state in which the flexible circuit 134 is fitted to the integrated unit 109. FIG. 15(a) shows an exploded perspective view of an objective lens drive unit 114, and FIG. 15(b), an overall perspective view of the optical head.

Herein, reference numeral 101 denotes a silicon substrate; 102, a semiconductor laser fixed over the silicon substrate 101; 103, a multi-divided light detector formed over the silicon substrate 101 by an IC process; 104, a radiator plate for holding the silicon substrate 101 in a thermally conductive state via silver paste; 105, a terminal wire-connected by wire bonding or otherwise from the multi-divided light detector; and 106, a resin package for holding the silicon substrate 101, the radiator plate 104 and the terminal 105.

Figure 13:
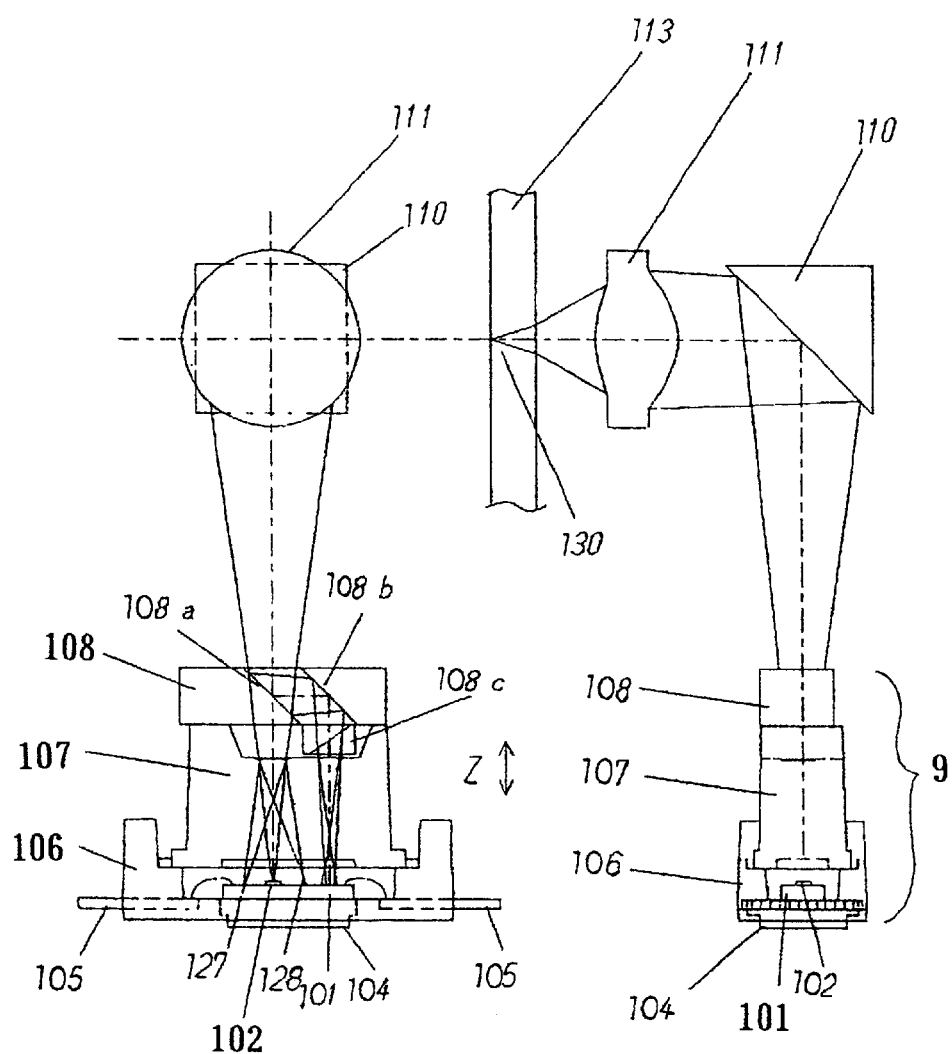
FIG. 13 consists of schematic diagrams showing the optical configuration of an optical head pertaining to Embodiment 2-1 of the invention.

FIG. 13 consists of schematic diagrams of the optical configuration of the optical head, wherein reference numeral 107 denotes a hologram element (diffraction grating) formed of resin; and 108, a composite element configured of a beam splitter 108a, a folded mirror 108b and a polarizing-separating element 108c.

What is integrally configured of the elements denoted by 101 through 108 above is defined to be the integrated unit 109.

Reference numeral 110 denotes a reflector mirror; 111, an objective lens fixed to an objective lens holder 112; 113, a photomagnetic recording medium having a magneto-optic effect; 114, an objective lens drive unit for driving the objective lens in the focusing and radial directions of the photomagnetic recording medium 113; and 115, a base constituting a component element of the objective lens drive unit 114. The objective lens drive unit consists of parts denoted by 111, 112, 115 and so forth.

Reference numeral 116 denotes a resin-made optical bench; 117, a light spot, formed on the multi-divided light detector 103, for detecting a focusing error signal; 118, a light spot, formed on the multi-divided light detector 103, for detecting a tracking error signal; 119, a main beam (P polarized light) formed on the multi-divided light detector 103; 120, a main beam (S polarized light) formed on the multi-divided light detector 103; 121, a focusing error signal light receiving area; 122 and 123, tracking error signal light receiving areas; 124, an information signal light receiving area; 125, a subtractor; 126, an adder; 127 and 128, focuses of the focusing error signal detecting light spot; 130, a light spot formed on the photomagnetic recording medium 12; 131, an adhesive; 133, a metallic optical head cover; and 139, a GND potential part.

What are denoted by 135 and 136 in FIG. 10 are respectively a heat transfer section A and a heat transfer section B provided in the flexible circuit 134, and 137 denotes a heat transfer line formed of copper foil.

What is denoted by 138 in FIG. 12 is a contact section formed in a convex shape by pressing or otherwise over the optical head cover 133. This contact section 138, in contact with the heat transfer section B 136, is provided to transfer heat to the optical head cover 133.

The flexible circuit 134 is usually configured in a three-layered structure consisting of a base film (of polyimide or the like), copper foil and cover film (polyimide); either the cover film or the base film has an opening, and the copper foil thereby exposed is solder-plated to form the heat transfer section A135 and the heat transfer section B136. Incidentally, the copper foil to be used as signal line is electrically separated.

The reflector mirror 110 is fixed to the optical bench 116 by adhesion or otherwise. The integrated unit 109 is solder-fixed to the flexible circuit 134 by the GND potential part 139 of its terminal 105 (is varied from the state of FIG. 10(a) to that of FIG. 10(b); i.e. the part in which the heat transfer section B of the flexible circuit 134 is situated is folded downward as shown in FIG. 10(b)). After that, it is inserted into the optical bench 116. This results in a configuration in which the radiator plate 104 and the heat transfer section A135 are in contact with each other.

Further, the integrated unit 109 is fitted and fixed to the optical bench 116 by fixing the optical bench 116 and the resin package 106 together by adhesion.

As a result, the position of the multi-divided light detector 103 in the Z axis direction (the direction of the optical axis), the dimensions of the optical bench 116 are determined so that the light receiving surface lies at about the midpoint between the focuses 127 and 128 of the light spot.

On the other hand, the semiconductor laser 102 is fixed to the silicon substrate 101 in a thermally conductive state by soldering or otherwise and wire-connected onto the multi-divided light detector 103 by wire bonding. The multi-divided light detector 103 is fixed to the radiator plate 104 in a thermally conductive state via silver paste, and heat generated by the semiconductor laser 102 is transmissive to the radiator plate 104 via the silicon substrate 101.

The multi-divided light detector 103 and the terminal 105 are wire-connected by wire bonding, and the terminal 105 is soldered onto the GND potential part 139 of the flexible circuit 134 as stated above.

Figure 14:
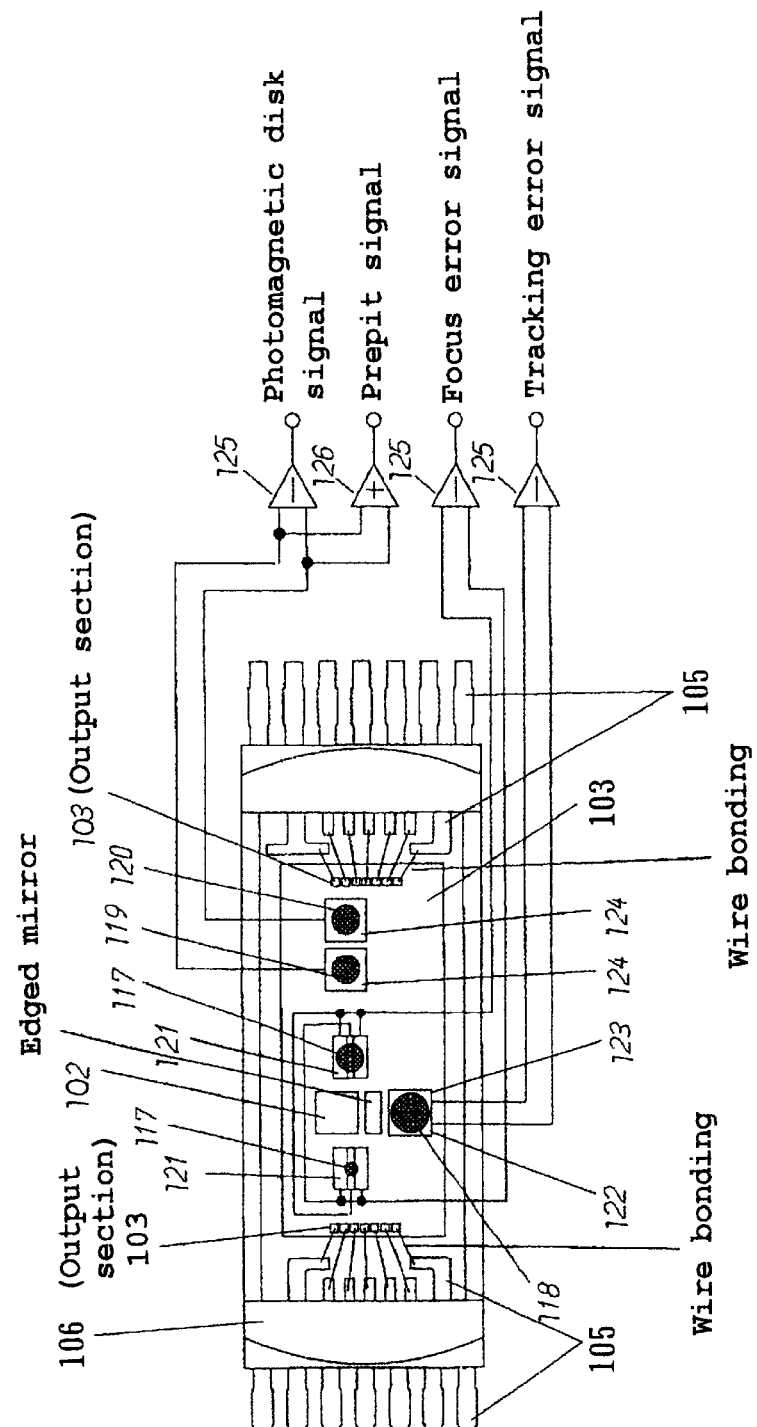
FIG. 14 is a schematic view of the light receiving/emitting element of the optical head pertaining to Embodiment 2-1 of the invention.

As illustrated in FIG. 14, the heat transfer section B136 of the flexible circuit 134 and the optical head cover 133 are in a state of interplanar contact, and heat accompanying the light generation of the semiconductor laser 102 is radiated by the optical head cover 133 via the heat transfer section A135, heat transfer section B136 and contact section 138 of the flexible circuit 134.

The operation of Embodiment 2-1 configured as described above will be explained below with reference to FIGS. 13 and 14.

Light emitted from the semiconductor laser 102 is reflected by an edged mirror (reflector mirror) formed over the multi-divided light detector 103 by etching or otherwise with its optical axis varied by 90 degrees. The light reflected by the edged mirror is separated into a plurality of different luminous fluxes by the hologram element 107.

The plurality of different luminous fluxes are transmitted by the beam splitter 108a of the composite element 108, reflected by the reflector mirror 110, and condensed by the objective lens 111 fixed to the objective lens holder 112 into the light spot 130 of about 1 micron in diameter on the photomagnetic recording medium 113.

A luminous flux reflected by the beam splitter 108a of the composite element 108 comes into incidence on a light receiving element for laser monitoring (not shown) to control the drive current for the semiconductor laser 102.

The light reflected from the photomagnetic recording medium 113 travels over a reverse route, is reflected and separated by the beam splitter 108a of the composite element 108, comes into incidence on the folded mirror 108b and the polarizing-separating element 108c, is separated by the polarizing-separating element 108c into mutually orthogonal luminous fluxes having two polarized light components, and comes into incidence on the information signal light receiving area 124.

Out of the reflected light from the photomagnetic recording medium 113, the luminous flux transmitted by the beam splitter 108a is separated into a plurality of luminous fluxes by the hologram element 107, and condensed into the focusing error signal light receiving area 121 and the tracking error signal light receiving areas 122 and 123. Focus servo is accomplished by the so-called SSD method, and tracking servo, by the so-called push-pull method.

Further, by computing the difference between the main beam 119 consisting of the P polarized light and the main beam 120 consisting of the S polarized light, it is made possible to detect photomagnetic disk information signals by a differential detecting method. Further by adding them, detection of prepit signals is made possible.

In the optical head configured as described above, in order to obtain desired detection signals with the reflected light from the photomagnetic recording medium 113, the relative positions of the semiconductor laser 102, the objective lens 111 and the multi-divided light detector 103 are adjusted at the time of assembly.

Regarding the adjustment of these relative positions, the adjustment of the focusing error signal and the tracking error signal is accomplished by shifting the objective lens drive unit 114 in the Y and X directions while holding the base 115 with an external jig (not shown) so as to adjust the outputs of the tracking error signal light receiving areas 122 and 123 to be substantially equal. This adjustment eventually serves to align the center of the objective lens 111 with respect to the center of the light emitting axis of the semiconductor laser 102 as shown in FIG. 13.

On the other hand, the adjustment of the relative inclinations of the photomagnetic recording medium 113 and the objective lens 111 is accomplished by carrying out skew adjustment θR in the radial direction (around the Y axis) and skew adjustment θT in the tangential direction (around the X axis) while holding the base 115 with an external jig (not shown). After these adjustments, with the state kept as it is, the base 115 is adhered and fixed to the optical bench 116 using the adhesive 131. In the foregoing way, the focusing error signal and the tracking error signal are adjusted, and skews are adjusted, and four points are adhered and fixed to complete the optical head.

As described above, according to Embodiment 2-1, heat accompanying the light generation of the semiconductor laser 102 is radiated by the optical head cover 133 via the radiator plate 104, the heat transfer section A135, heat transfer section B136 and contact section 138 of the flexible circuit 134.

Of course it is possible to substantially enhance the efficiency of heat transfer by expanding the pattern areas of the heat transfer section A135, heat transfer section B136 and heat transfer line 137 of the flexible circuit 134. Therefore, no matter whether the optical head cover 133 is made of resin or metal or even if it is not in thermal contact with the heat transfer section B136, the heat radiating effect is sufficiently ensured by the presence of the flexible circuit 134.

Since heat radiation by the optical head cover 133 can thus secure a large radiation area, it is made possible to substantially enhance heat radiation efficiency. Hereupon, as the heat transfer section A135 and the heat transfer section B136 of the flexible circuit 134 which come into contact with the radiator plate 104 and the contact section 138 are in an elastic state, the configuration is such as to permit ready interplanar contact, resulting in a substantial enhancement of heat transfer efficiency.

Furthermore, as a convection of air is generated by the rotation of the photomagnetic recording medium 12 over the top surface of the optical head cover 133 at hundreds to thousands of rpm, the heat radiating effect is even more enhanced, making it possible to reduce the increase in the drive current for the semiconductor laser 102 due to a temperature rise and according to save power consumption by the optical head.

Also, as the optical head cover 133 permits efficient heat radiation, even if the optical bench 116 is made of a non-metal, such as resin, for cost saving, a low power consumption optical head can be realized.

Although the optical bench 116 is made of resin in Embodiment 2-1, there will be no problem if the material is non-resin non-metal or metal. In the latter case, there would be further heat radiation from the optical head cover 133 to the metallic optical bench 116, and accordingly the heat radiation efficiency would be further enhanced.

Also, in Embodiment 2-1, though the contact section 138 is configured to manifest a convex shape relative to the optical head cover 133, it is also conceivable to do away with the contact section 138 and keep the part flat. Then, the configuration would be such that the heat transfer section B136, consisting of solder plating or the like, rise from the surface of the flexible circuit 134 and be in interplanar contact with the optical head cover 133.

Further in Embodiment 2-1, while the thickness of the heat transfer line 137 (the thickness of the copper foil) is equal to those of other signal lines, a configuration in which only the heat transfer line 137 is thicker than others could further enhance the efficiency of heat transfer.

Also, as shown in FIG. 9, the thickness of the heat transfer line 137 is smaller than those of the two heat transfer sections, and this is intended to facilitate the aforementioned folding of the part to be folded.

To add, as the heat transfer line from the radiator plate 104 to the optical head cover 133, instead of the aforementioned copper foil of the flexible circuit 134, a completely different heat conductive member may as well be formed over the front or back side.

Embodiment 2-2

Figure 16:
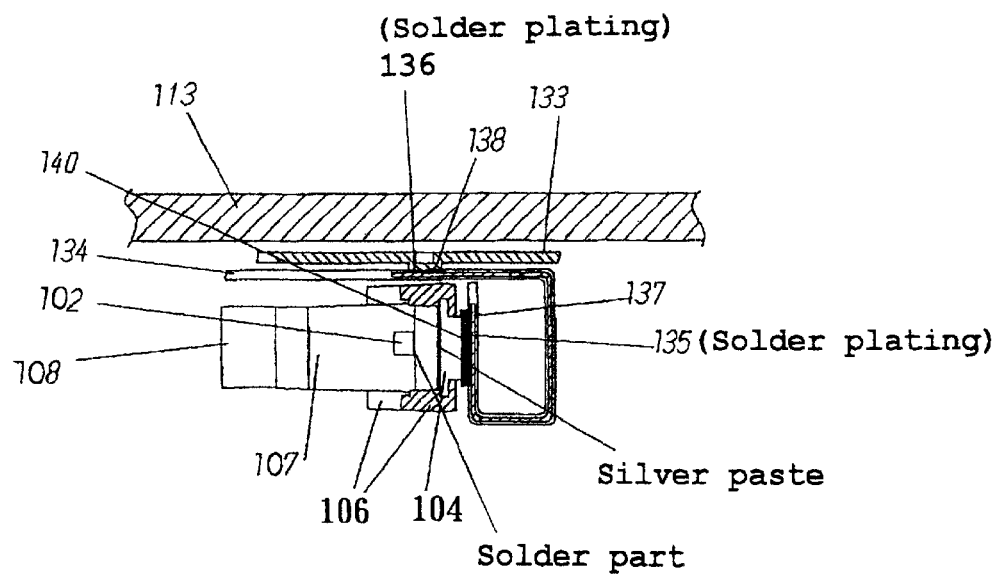
FIG. 16 consists of schematic partial sections of an optical head pertaining to Embodiment 2-2 of the invention.
Figure 16:
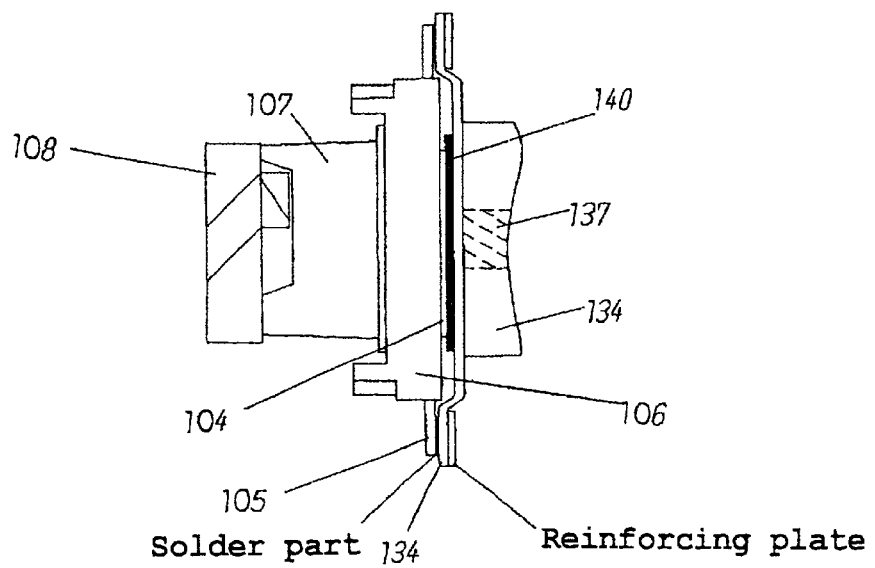

Next will be described Embodiment 2-2 with reference to FIG. 16. This embodiment differs from Embodiment 2-1 in the configuration in which the contact section between the radiator plate 104 and the heat transfer section A135 is filled with solder, creamy solder or a heat transmissive material 140 having oil as the base and blended with powder of alumina or the like to increase the area of contact between the radiator plate 104 and the heat transfer section A135 and thereby enhancing heat transfer efficiency.

This configuration makes it possible to further enhance heat radiation performance and to realize an optical head with a further saving in power consumption.

It goes without saying that a further enhancement in heat transfer efficiency can be achieved by filling the space between the contact section 138 and the heat transfer section B136 with a similar heat transmissive material.

Embodiment 2-3

Figure 17A:
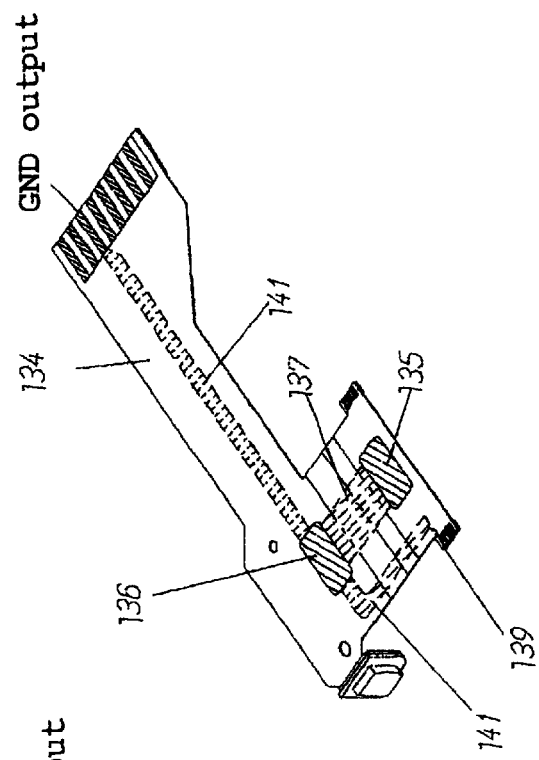
FIG. 17 consists of schematic partial expansion plans of a flexible circuit pertaining to Embodiment 2-3 of the invention.
Figure 17B:
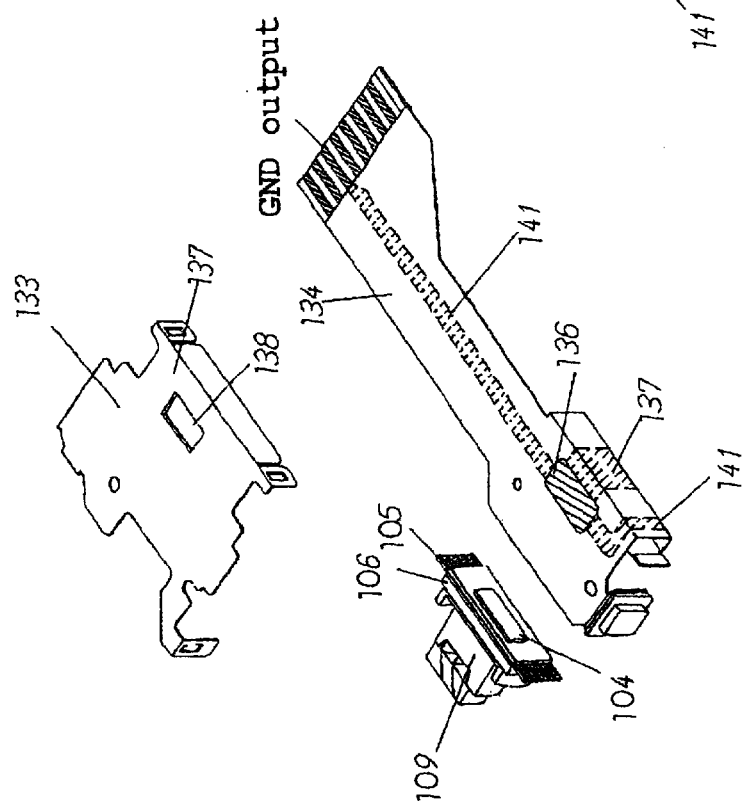
Figure 18:
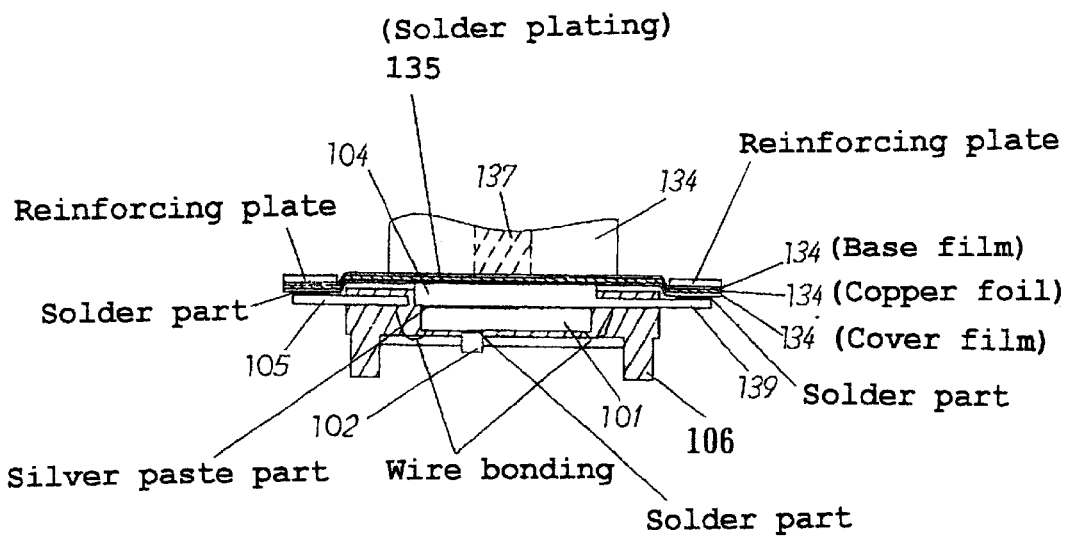
FIG. 18 consists of schematic partial sections of an integrated unit pertaining to Embodiment 2-3 of the invention.
Figure 18:
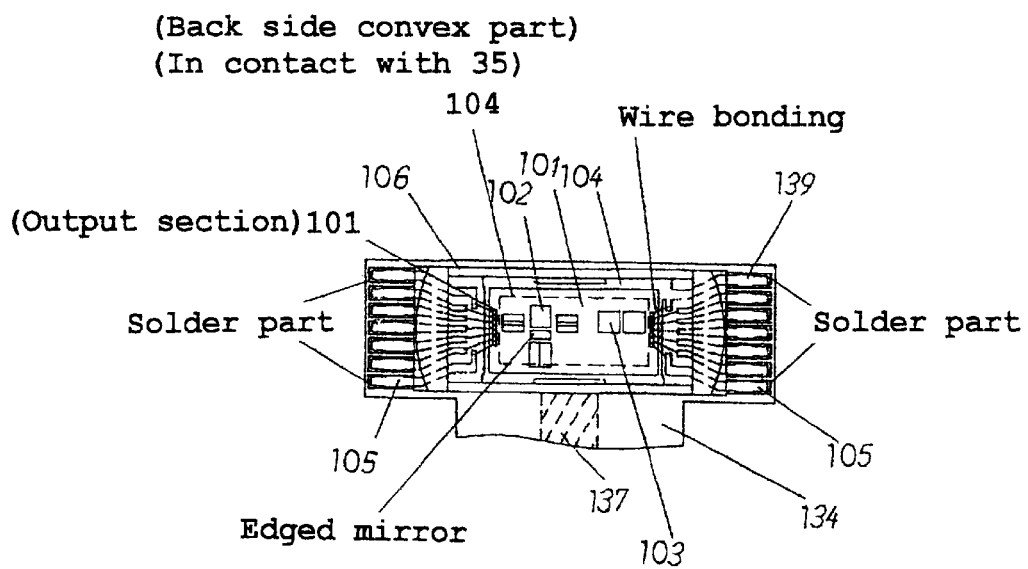

Next will be described Embodiment 2-3 with reference to FIGS. 17 and 18. This embodiment differs from Embodiment 2-1 in that the radiator plate 104 is set to a GND potential by connecting the GND potential part 139 of the terminal 105 and the radiator plate 104 and in the configuration in which heat is transferred by the heat transfer section B136 to the optical head cover 133 by connecting the GND line 141 of the flexible circuit 134 and the heat transfer line 137.

This configuration serves to further expand the heat transfer area and enhance the efficiency of heat radiation.

Also, the setting of the optical head cover 133 at the GND potential makes possible connection without problem even if the optical head feed apparatus is at the GND potential.

Furthermore, though in Embodiment 2-3 the GND line 141 and the heat transfer line 137 are connected to make up the same line, another configuration is also conceivable in which they remain separate lines and another heat transfer section equivalent to the heat transfer section B136 is further composed to radiate heat to the optical head cover 133.

Embodiment 2-4

Figure 19:
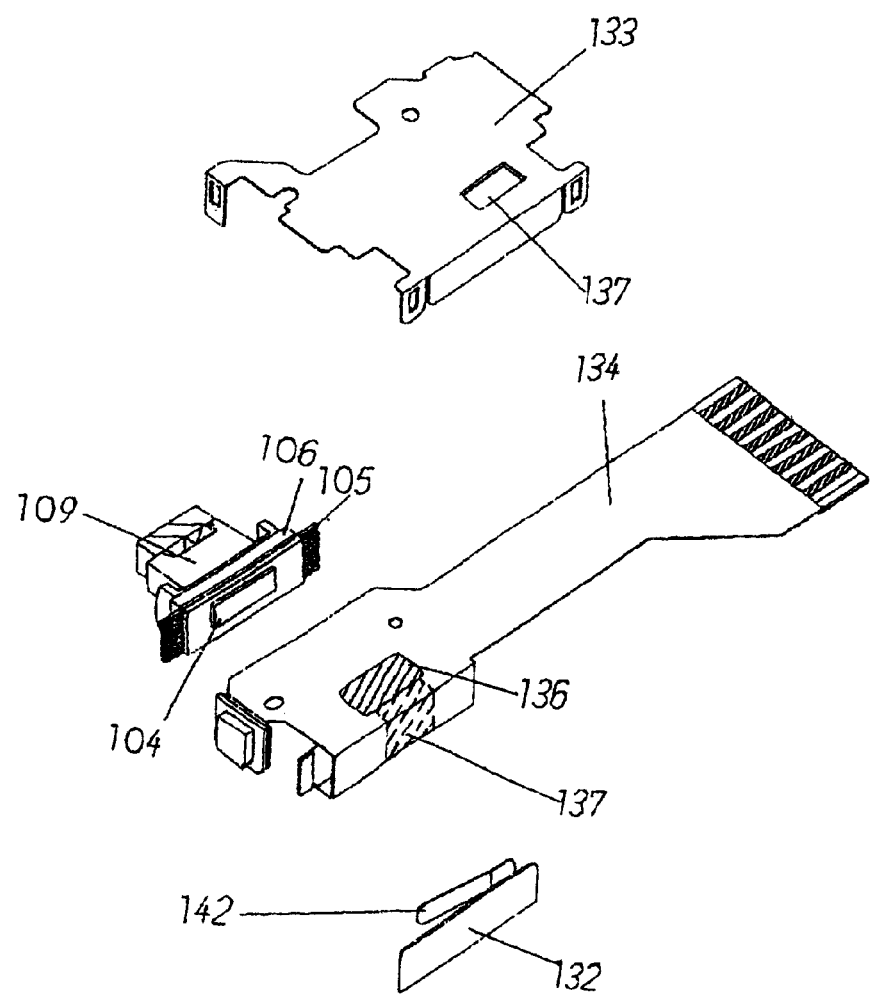
FIG. 19 is a schematic exploded perspective view of an optical head pertaining to Embodiment 2-4 of the invention.
Figure 20:
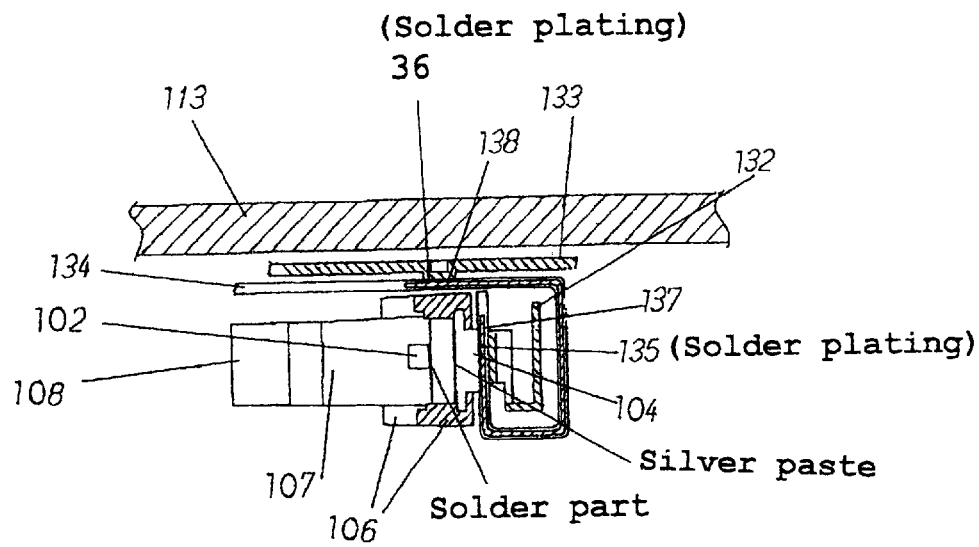
FIG. 20 consists of schematic partial sections of an optical head pertaining to Embodiment 2-4 of the invention.
Figure 20:
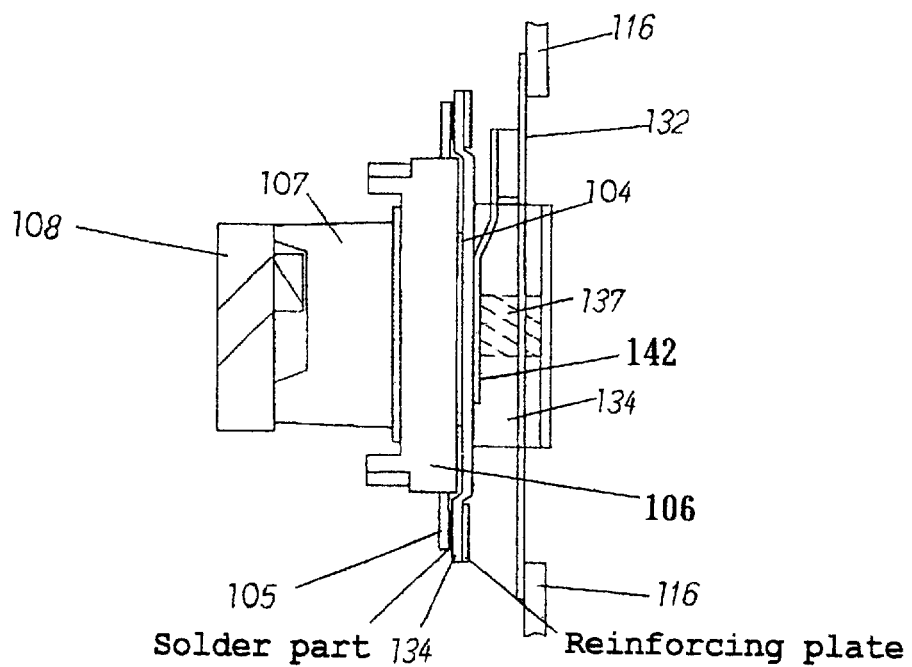

Next will be described Embodiment 2-4 with reference to FIGS. 19 and 20. This embodiment differs from Embodiment 2-1 in that the radiator plate 132 is used as an example of heat transfer member according to the invention, and the tightness of adhesion between the heat transfer section A135 and the radiator plate 104 is further increased by preloading (applying pressure) in the direction of the Z axis in the drawing, resulting in enhancement of the efficiency of heat transfer.

Incidentally, it goes without saying that the addition of the radiator plate 132 to the configuration of Embodiment 2-1, 2-2 or 2-3 would serve to further enhance the efficiency of heat transfer. Furthermore, in Embodiment 2-1, 2-2 or 2-3 where the radiator plate 132 is added, it is not absolutely necessary for any heat transfer section of the flexible circuit and the radiator plate be in contact with each other.

Embodiment 2-5

Figure 21:
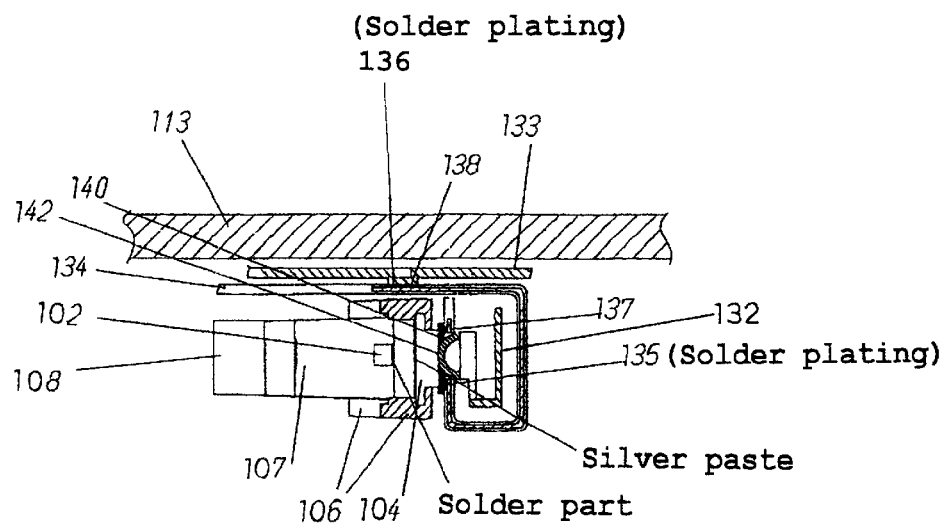
FIG. 21 consists of schematic partial sections of an optical head pertaining to Embodiment 2-5 of the invention.
Figure 21:
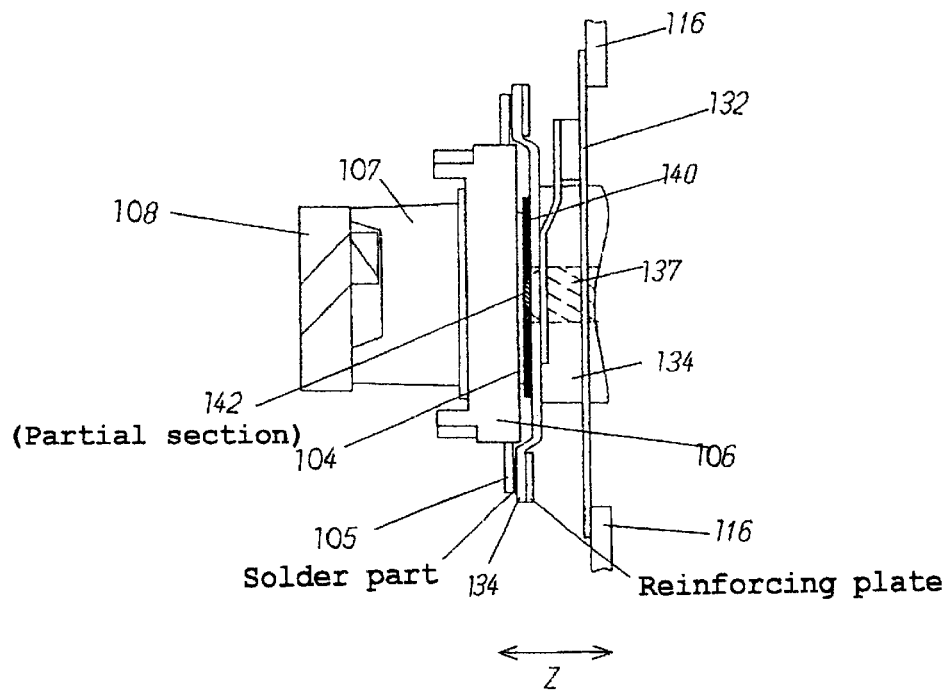

Next will be described Embodiment 2-5 with reference to FIG. 21. This embodiment differs from Embodiment 2-2 in that a hole is bored into a part of the heat transfer section A135 to bring a heat transfer terminal 142, provided at the tip of the radiator plate 132 having a curved face, into direct contact with the radiator plate 104 so that the heat of the radiator plate 104 be directly transferred to the radiator plate 132 and in that the heat transfer section A135, the radiator plate 104 and the heat transmissive material 140 are brought into even closer adhesion by preloading by the radiator plate 132 in the Z direction, resulting in further enhancement of the efficiency of heat transfer and heat radiation performance.

To add, in Embodiment 2-5, the heat transmissive material 140 can be dispensed with.

Also, it is possible to further enhance the efficiency of heat transfer by bringing the radiator plate 132 into contact with the optical head cover 133.

Figure 22:
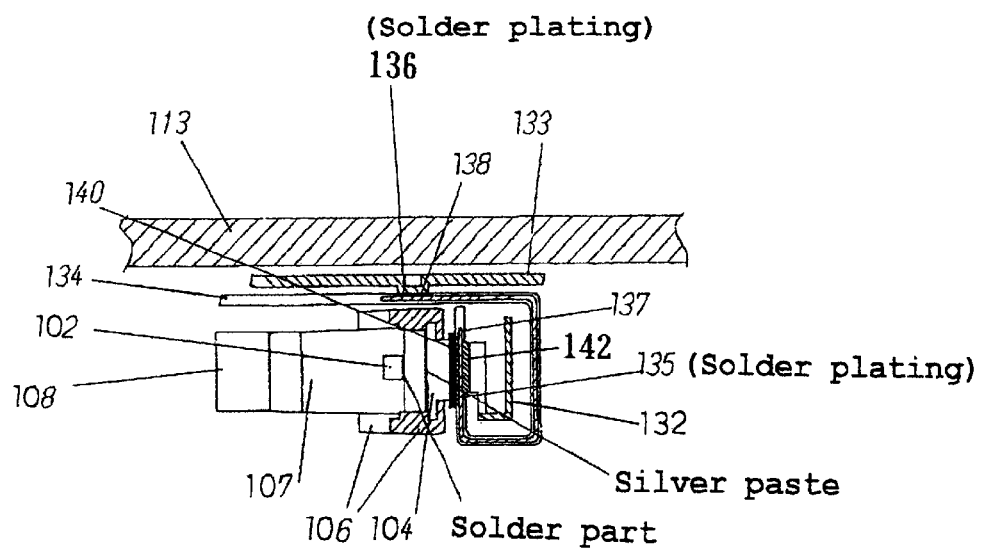
FIG. 22 consists of schematic partial sections of an optical head pertaining to Embodiment 2-5 of the invention.
Figure 22:
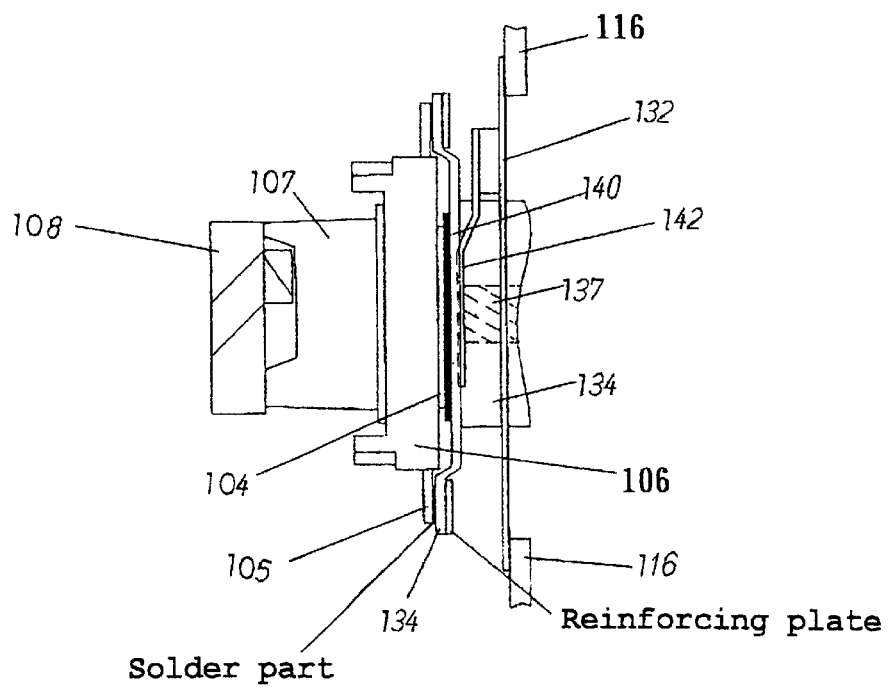

Further, in another conceivable configuration, as shown in FIG. 22, a hole is bored in a part of the base film of the flexible circuit 134 to bring the heat transfer terminal 142 of the radiator plate 132 into contact with the copper foil of the heat transfer section 135.

Embodiment 2-6

Figure 23:
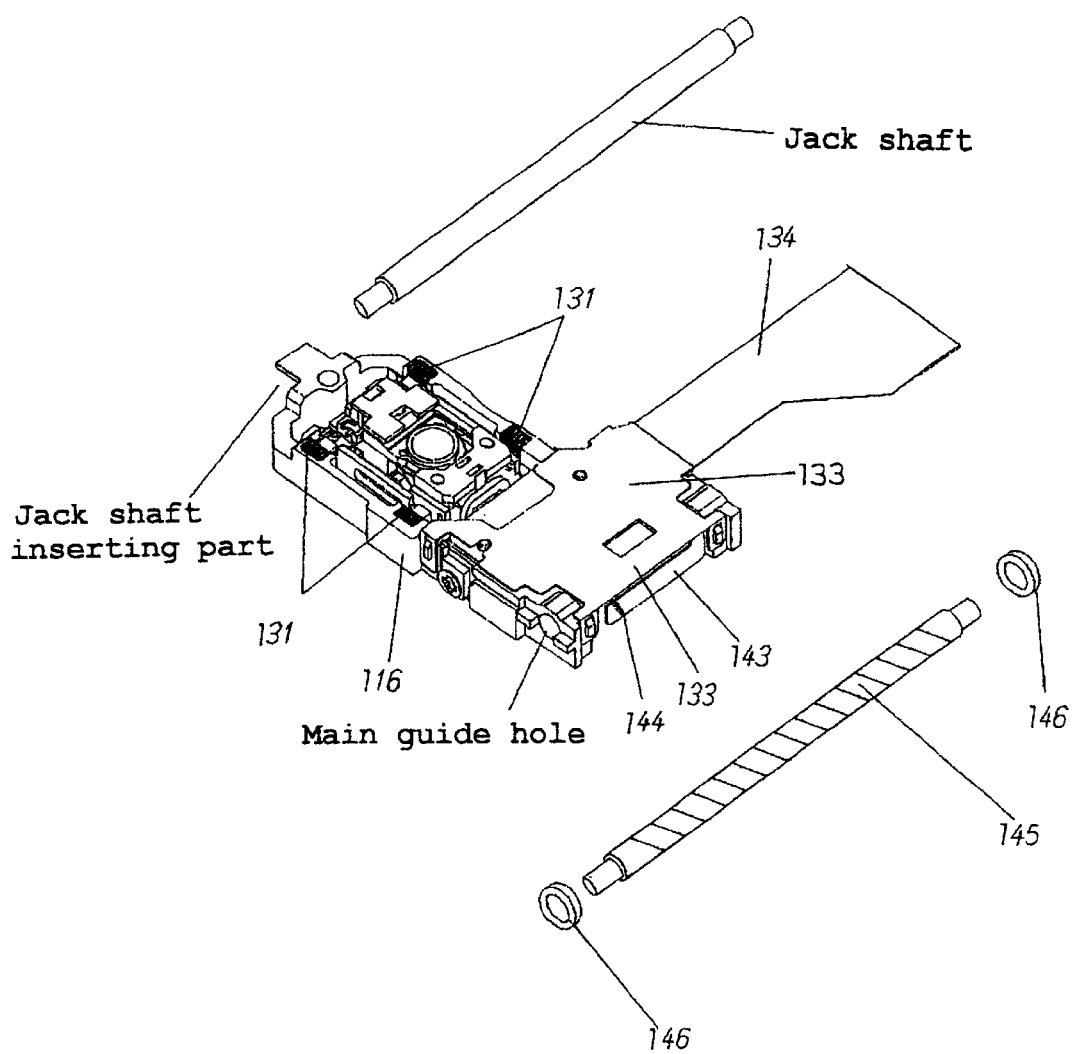
FIG. 23 is a schematic perspective view of an optical head pertaining to Embodiment 2-6 of the invention.
Figure 24:
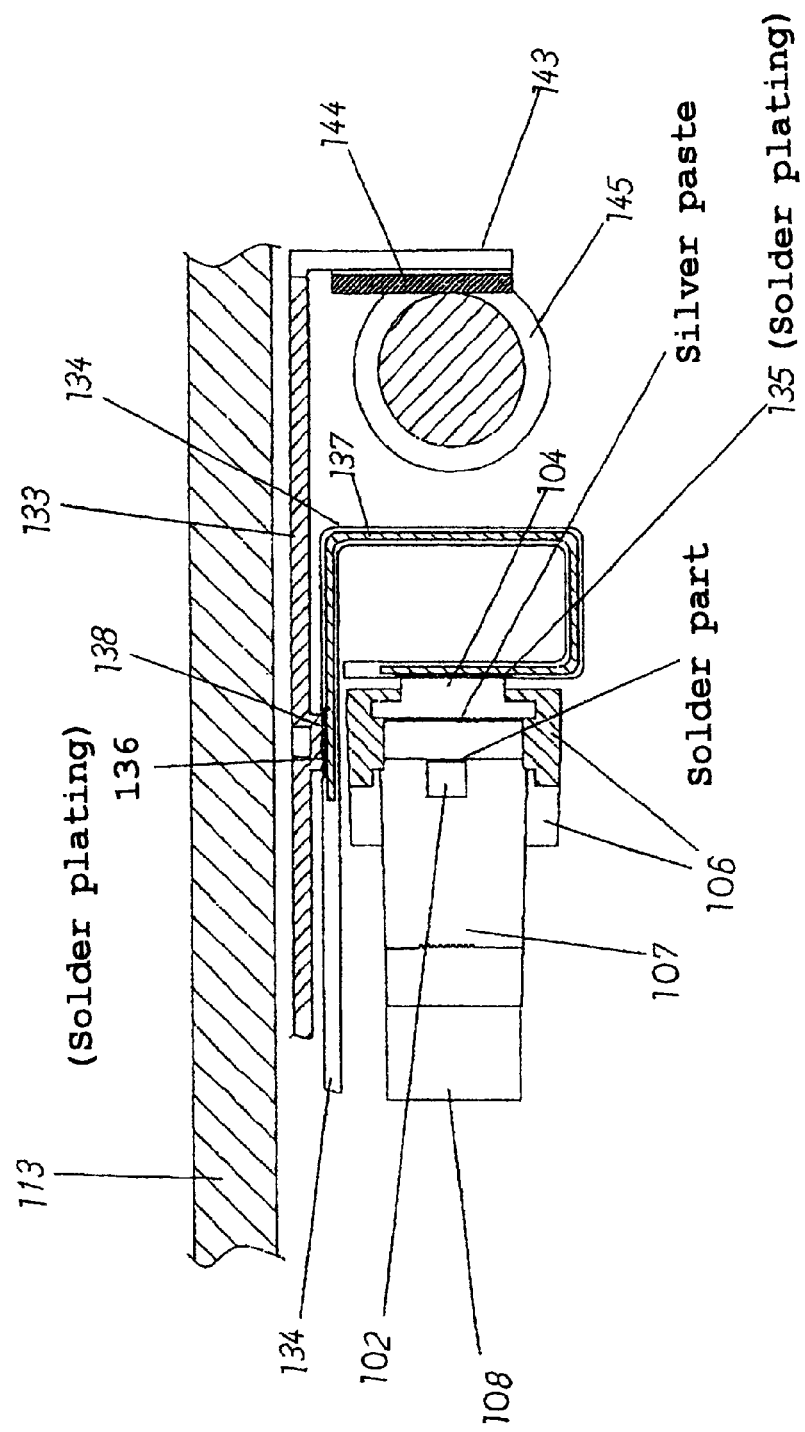
FIG. 24 is a schematic partial section of an optical head pertaining to Embodiment 2-6 of the invention.

Next will be described Embodiment 2-6 with reference to FIGS. 23 and 24. This embodiment differs from Embodiment 2-1 in that the optical head cover 133, a feed nut 143 and a fitting section 144 are integrally configured of sheet metal or the like. In this case, the feed nut 143 is coupled to the optical head cover 133 in a thin part so that it can have the function of a sheet spring.

Further, a metallic feed screw 145 is inserted into a main guide hole bored in the optical bench 116 and fitted with the metallic fitting section 144 in a configuration to drive the optical head in the radial direction of the photomagnetic recording medium 113 by rotation. This causes heat accumulated in the optical head cover 133 to be radiated to the feed screw 145 through the feed nut 143 and the fitting section 144.

This configuration makes it possible to further enhance the efficiency of heat transfer and that of heat radiation.

To add, it goes without saying that while the feed screw 145, which herein is fixed to a mechanism chassis or the like by a bearing 146 made of resin or metal, it may as well be fixed to the mechanism chassis without using the bearing 146.

Also, where the optical bench 116 is made of metal, it is also possible to radiate heat to the optical bench 116 and a jack shaft via the optical head cover 133.

Furthermore, it goes without saying that, even in an optical head feed apparatus of a configuration in which the shaft is inserted into the main guide hole of the optical bench 116 and the feed screw 145 is arranged beside it, it is possible to achieve heat radiation by fitting the feed screw 145 and the fitting section 144 of the nut 143.

To add, it is also conceivable not to use the nut 143 fixed to the optical head cover 133 as in this embodiment, and instead to form a nut on the part of the radiator plate 132 to perform head feeding.

Embodiment 2-7

Figure 25:
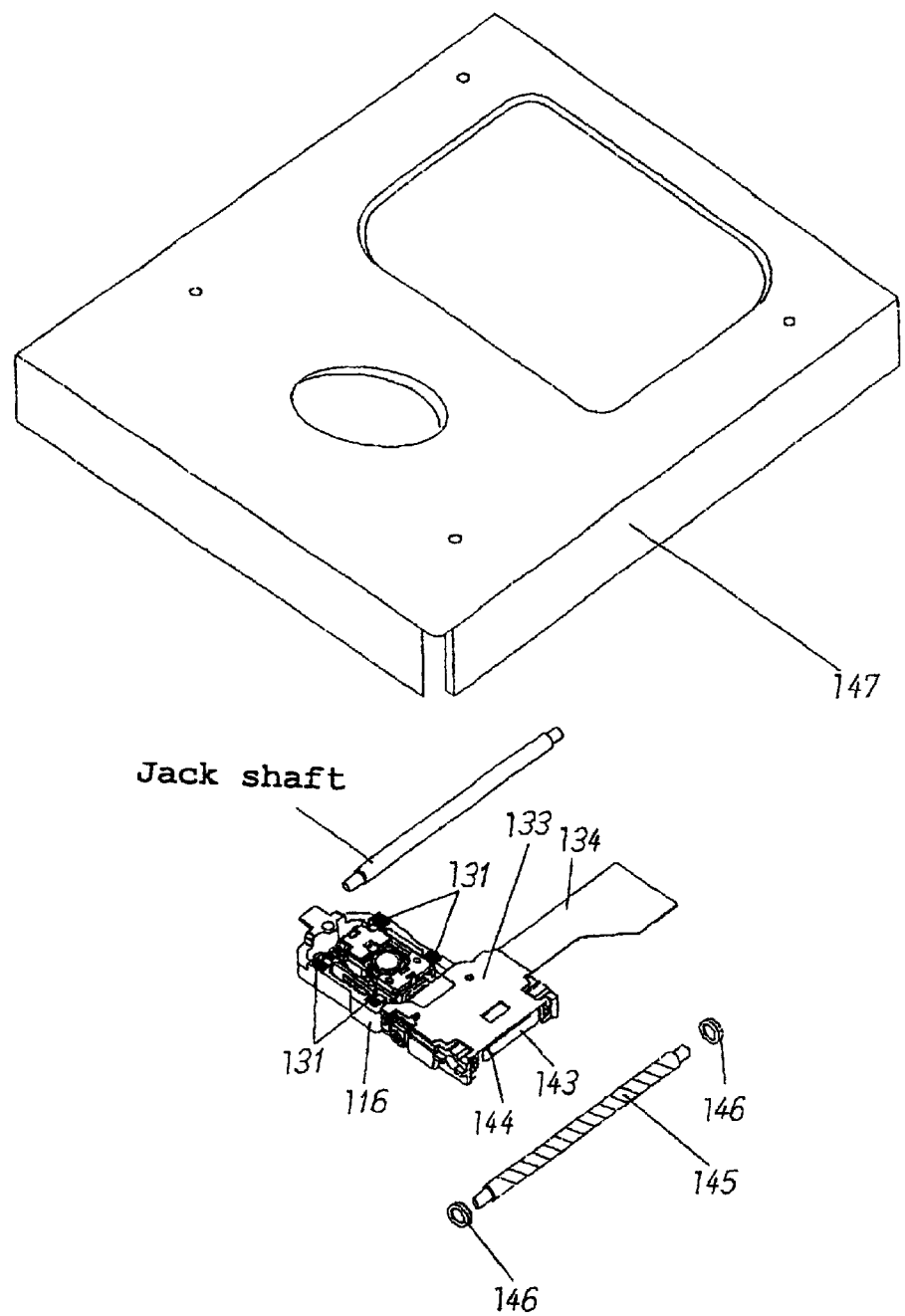
FIG. 25 is a schematic exploded perspective view of an optical head and an optical head feed unit pertaining to Embodiment 2-7 of the invention.
Figure 26:
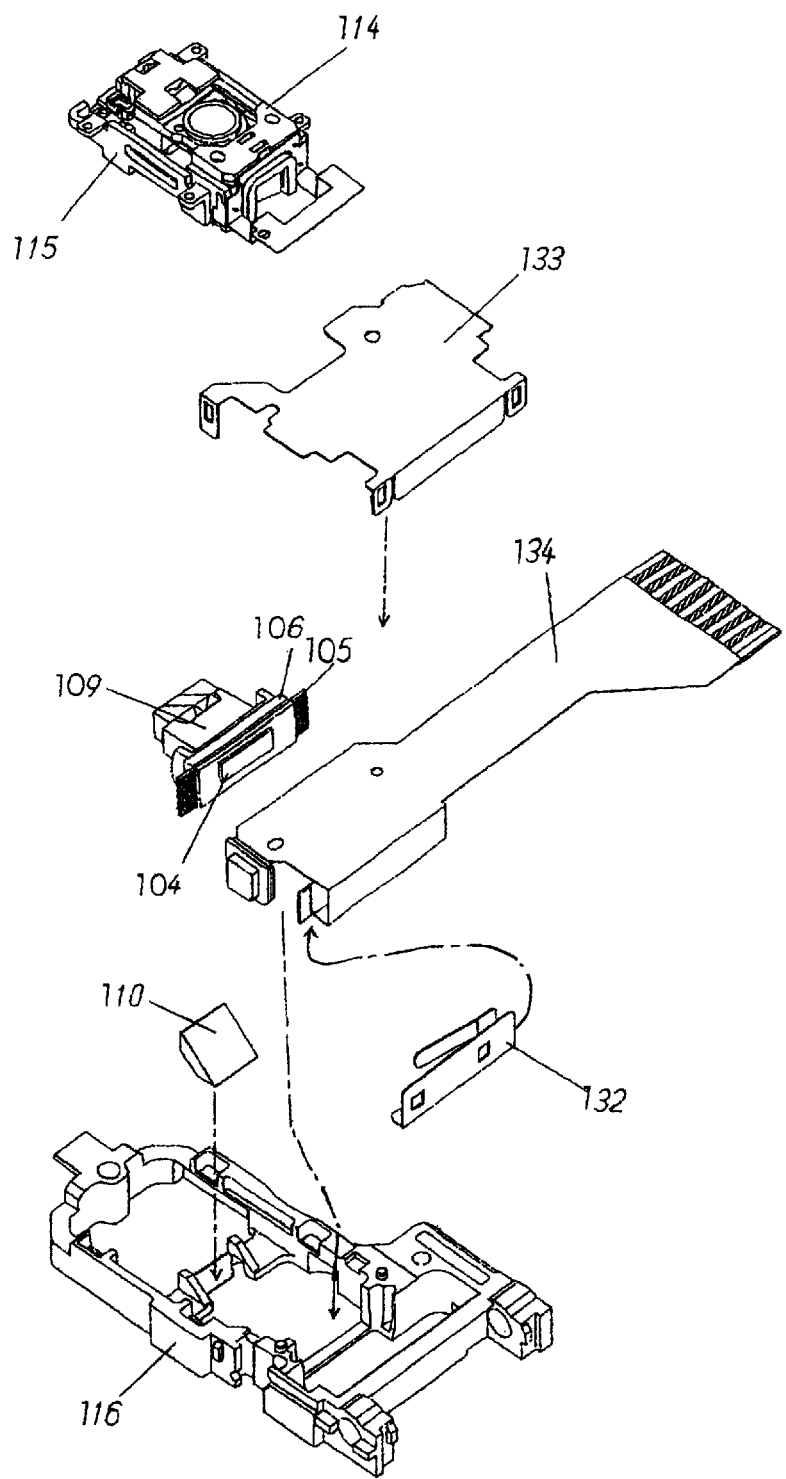
FIG. 26 is a schematic exploded perspective view of an optical head according to the prior art.
Figure 27:
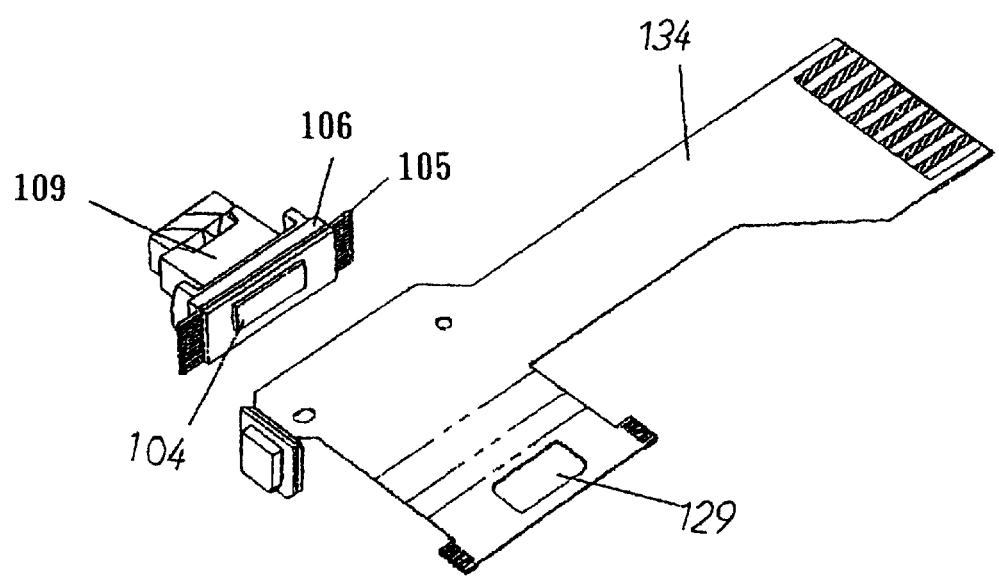
FIG. 27 is a schematic expansion plan of a flexible circuit of the optical head according to the prior art.
Figure 28:
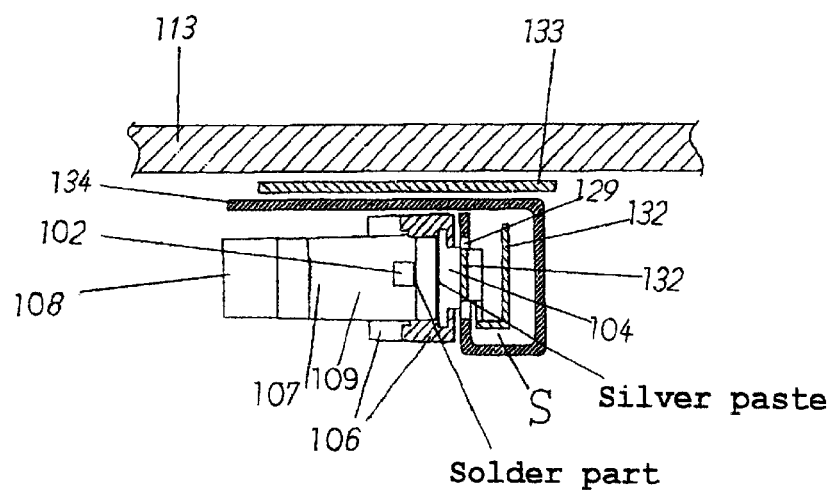
FIG. 28 consists of schematic partial sections of the optical head according to the prior art.
Figure 28:
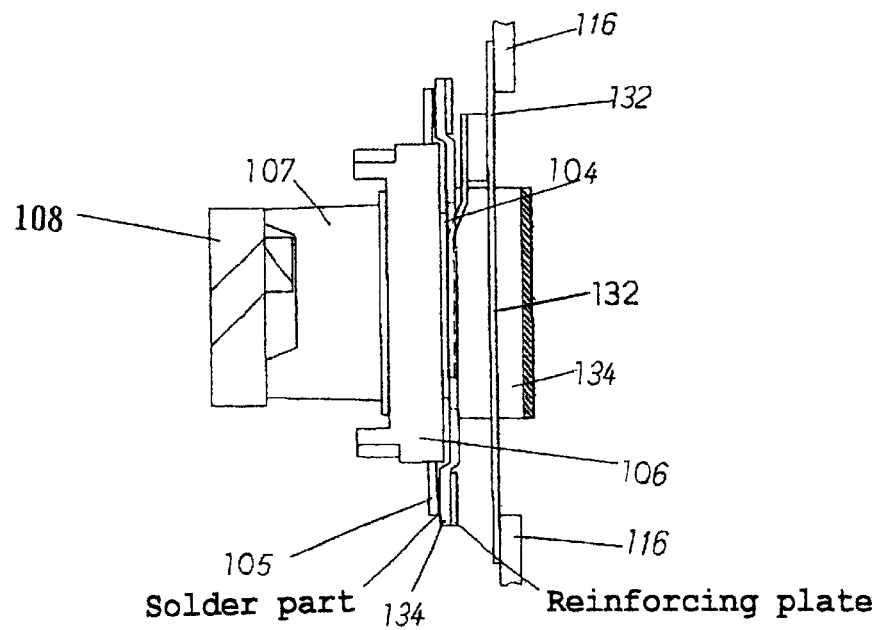
Figure 29:
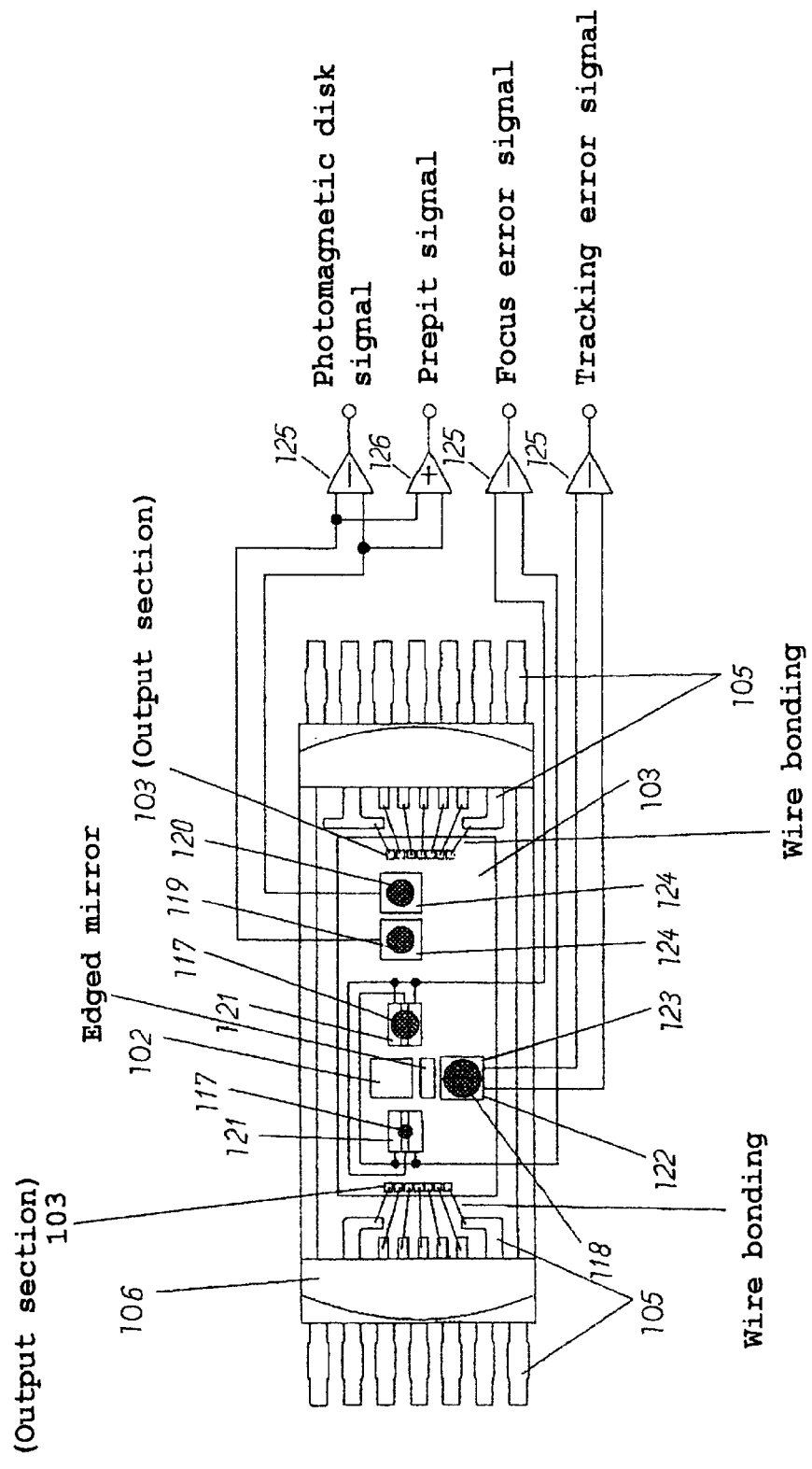
FIG. 29 is a schematic view of the light receiving/emitting element of the optical head according to the prior art.
Figure 30:
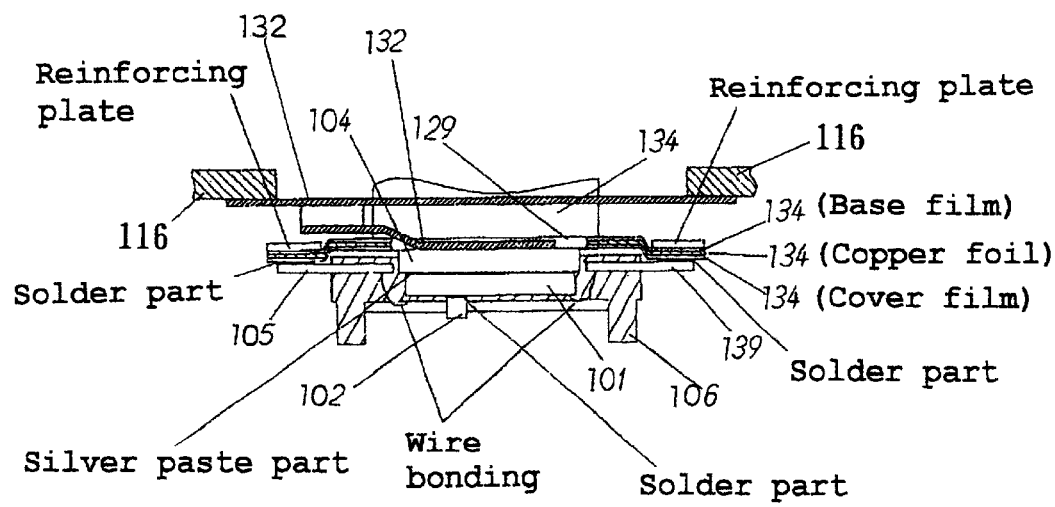
FIG. 30 consists of schematic partial sections of the integrated unit of the optical head according to the prior art.
Figure 30:
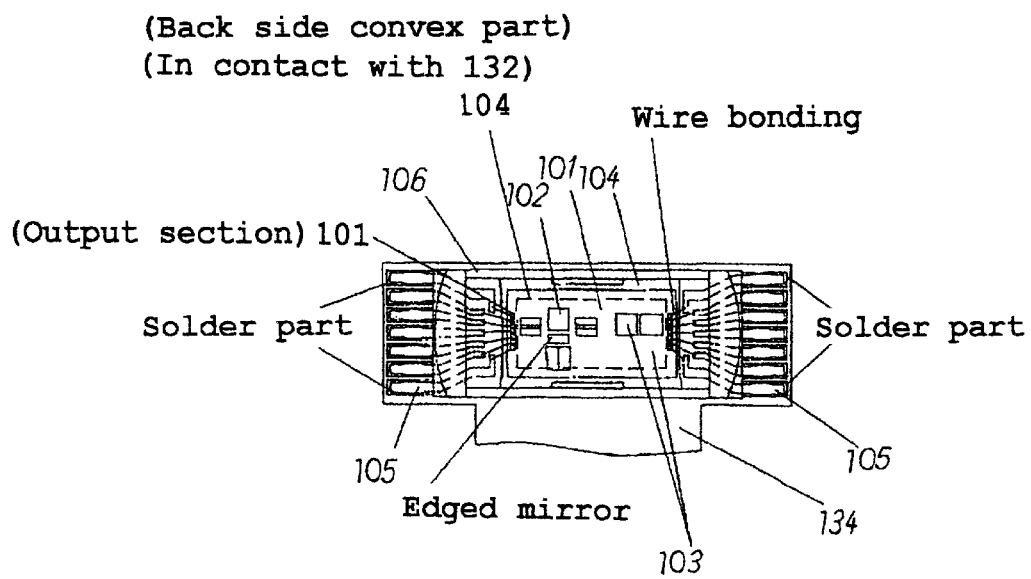
Figure 32A:
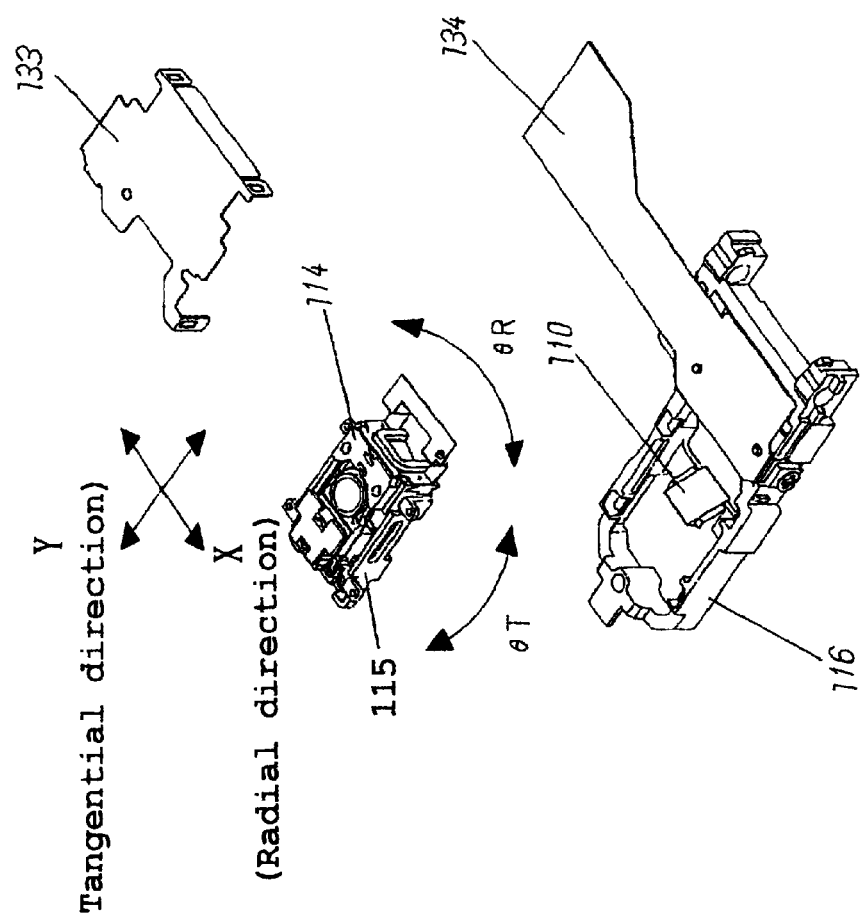
FIG. 32 consists of schematic diagrams illustrating a method to adjust the optical head according to the prior art.
Figure 32B:
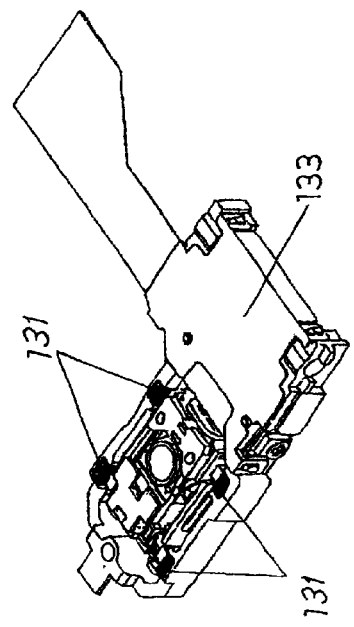

Next will be described Embodiment 2-7 with reference to FIG. 25. This embodiment differs from Embodiment 2-6 in that the feed screw 145 is brought into contact rotatably with the mechanism chassis 147 in a thermally conductive state by the metallic bearing 146.

This configuration enables the heat accumulated in the optical head cover 133 and the feed screw 145 to be transferred to the mechanism chassis 147 and to be radiated, resulting in further enhanced heat transfer and heat radiation effects.

To add, though in Embodiment 2-7 the metallic bearing 146 is used for bringing the feed screw 145 into contact with the mechanism chassis 147, any arrangement in which heat can be transferred and the feed screw 145 is rotatable can be used.

Furthermore, it goes without saying that, if the optical bench 116 is made of metal, a configuration in which heat is radiated from the jack shaft side to the mechanism chassis 147 can as well be used.

Incidentally, regarding the heat radiation performance of members, the applicability is not limited to examples in the above-described embodiments, but out of thermally conductive members, either all or only some of them may have heat radiating capability.

Industrial Applicability

As hitherto described, according to the present invention, the efficiency of heat radiation can be substantially enhanced and, by substantially enhancing the heat radiation performance of the optical head, its power consumption can be reduced to make it possible to realize a disk recording/reproducing apparatus capable of recording/reproducing for a long duration.

What is claimed is:

1. An optical head comprising a light source for emitting luminous energy recordable on a recording medium,
   a heat radiating section wherein a threaded part is formed, one end of said heat radiating section is in contact with the back surface of said light source, tightening by said threaded part causes the end of said heat radiating section to support said light source, and the other end of said heat radiating section is exposed to space, and
   a resin-made bench for mounting and fixing the aforementioned elements.

2. An optical head comprising a light source for emitting luminous energy recordable on a recording medium,
   a heat radiating section of which one end is in contact with the back surface of said light source and the other end is composed of a guide section which is in contact with a shaft supporting said optical head, and
   a resin-made bench for mounting and fixing the aforementioned elements.

3. An optical head comprising a light source for emitting luminous energy recordable on a recording medium,
   a heat radiating section of which one end is in contact with the back surface of said light source and the other end is composed of a spring section for pressing a shaft supporting said optical head, and
   a resin-made bench for mounting and fixing the aforementioned elements.

4. An optical head comprising a light source for emitting luminous energy recordable on a recording medium,
   a heat radiating section of which one end section is in contact with the back surface of said light source and the other end has an engaging section which engages with a threaded shaft for supporting and shifting said optical head, and
   a resin-made bench for mounting and fixing the aforementioned elements.

5. An optical head comprising:
   a light source for emitting luminous energy recordable on a recording medium,
   a heat radiating section, in contact with said light source, for radiating heat which accompanies the light emission thereof,
   a resin-made bench for mounting and fixing the aforementioned elements, and
   a magnetic head mechanism for applying magnetic field-modulation signals, wherein
   one of said heat radiating section is in contact with the back surface of light source and the other of same is in contact with a metallic member of said magnetic head mechanism.

6. The optical head as set forth in claim 5, characterized in that said resin-made bench and said heat radiating section are formed by integral molding.

7. An optical head comprising a light source for generating luminous energy required for recording on a disk-shaped information recording medium or reproducing information recorded on said disk-shaped information recording medium; a radiator plate, in contact with said light source either directly or indirectly, for guiding heat which accompanies the emission of light by said light source; an objective lens which is means for focusing light on said disk-shaped information recording medium; an objective lens drive unit for driving said objective lens in the focal and radial directions of said disk-shaped information recording medium; a light receiving element for receiving light reflected from said disk-shaped information recording medium; a sheet-shaped flexible circuit for feeding power to said light source and said light receiving element and communicating signals from said light receiving element, and having a heat transfer and heat radiating section either on the surface or inside; and an optical bench holding at least said light source, said objective lens drive unit, said radiator plate and said light receiving element,
   characterized in that said radiator plate is brought into contact with a heat transfer section provided in said flexible circuit and, by causing said flexible circuit to guide heat from said radiator plate, heat generated by said light source is radiated through said flexible circuit and said radiator plate.

8. The optical head as set forth in claim 7, further comprising a thermally conductive optical head cover fixed to said optical bench, wherein, by bringing into contact the heat transfer section of said flexible circuit and said optical head cover with each other and causing said flexible circuit to guide heat from said radiator plate, heat generated by said light source is radiated through said optical head cover.

9. An optical head comprising a light source for generating luminous energy required for recording on a disk-shaped information recording medium or reproducing information recorded on said disk-shaped information recording medium; a radiator plate, in contact with said light source either directly or indirectly, for guiding heat which accompanies the emission of light by said light source; an objective lens which is means for focusing light on said disk-shaped information recording medium; an objective lens drive unit for driving said objective lens in the focal and radial direction of said disk-shaped information recording medium; a light receiving element for receiving light reflected from said disk-shaped information recording medium; a sheet-shaped flexible circuit for feeding power and communicating signals to said light source and said light receiving element; a thermally conductive heat transfer member; an optical bench for holding at least said light source, said objective lens drive unit, said radiator plate, said light receiving element and said heat transfer member; and a thermally conductive optical head cover fixed to said optical bench, wherein:
   said radiator plate and said heat transfer member are brought into contact with each other, said heat transfer member is caused to guide heat from said radiator plate and, by bringing into contact said heat transfer member and said optical head cover with each other, heat generated by said light source is radiated by said light source through said optical head cover, said heat transfer member and said radiator plate.

10. An optical head comprising a light source for generating luminous energy required for recording on a disk-shaped information recording medium or reproducing information recorded on said disk-shaped information recording medium; a heat radiating section, in contact with said light source, for guiding heat which accompanies the emission of light by said light source; an objective lens which is means for focusing light on said disk-shaped information recording medium; an objective lens drive unit for driving said objective lens in the focal and radial direction of said disk-shaped information recording medium; a light receiving element for receiving light reflected from said disk-shaped information recording medium; a sheet-shaped flexible circuit for feeding power to said light source and said light receiving element and communicating signals from said light receiving element; a thermally conductive heat transfer member; an optical bench for holding at least said light source, said objective lens drive unit, and said heat transfer member, said radiator plate and said light receiving element; and a thermally conductive optical head cover fixed to said optical bench, wherein:

said radiator plate is brought into contact with a heat transfer section provided in said flexible circuit to cause said flexible circuit to guide heat from said radiator plate; heat generated by said light source is radiated through said optical head cover, said flexible circuit and said radiator plate by bringing into contact said the heat transfer section of said flexible circuit and said optical head cover with each other; said radiator plate and said heat transfer member are brought into contact with each to cause said heat transfer member to guide heat from said radiator plate; and by bringing into contact said heat transfer member and said optical head cover with each other, heat generated by said light source is radiated through said optical head cover and said heat transfer member.

11. The optical head as set forth in claim 10, characterized in that said radiator plate and the heat transfer section of said flexible circuit are brought into contact with each other, and said heat transfer member applies preloading on the contacting part of said heat transfer section and said radiator plate.

12. The optical head as set forth in any of claims 7 through 10, characterized in that said light receiving element is formed over a silicon substrate; said light source is fixed to said light receiving element in a thermally conductive state; and said radiator plate holds said light receiving element, fixes said light receiving element in a thermally conductive state and has a heat transfer function.

13. The optical head as set forth in any of claim 9 or 10, characterized in that a GND line formed in said light receiving element is connected to said radiator plate to set the potential of said radiator plate to GND, said radiator plate is brought into contact with said heat transfer member, and said optical head cover and said heat transfer member are also brought into contact with each other to set the potential of the optical head cover to GND.

14. The optical head as set forth in any of claims 7 through 10, characterized in that a heat transfer material having thermal conductivity or both thermal conductivity and electrical conductivity intervenes between said radiator plate and the heat transfer section of said flexible circuit.

15. The optical head as set forth in many of claims 7 through 10, characterized in that a GND line formed in said light receiving element is connected to said radiator plate to set the potential of said radiator plate to GND, said radiator plate is brought into contact with the GND line of said flexible circuit or said heat transfer section, and said optical head cover and the GND line of said flexible circuit or said heat transfer section are also brought into contact with each other to set the potential of the optical head cover to GND.

16. The optical head as set forth in any of claims 7 through 10, characterized in that said optical bench is made of metal, and the heat of said optical head cover is also radiated by said optical bench.

17. The optical head as set forth in any of claims 7 through 10, characterized in that said optical bench is not made of metal.

18. The optical head as set forth in any of claims 7 through 10, characterized in that said optical bench is made of metal, and the heat of said optical head cover not only is radiated by said optical bench but also is transferred through said optical bench to said feed screw and radiated.

19. An optical head feed apparatus for feeding an optical head, said optical head having a light source for generating luminous energy required for recording on a disk-shaped information recording medium or reproducing information recorded on said disk-shaped information recording medium; a radiator plate, in contact with said light source either directly or indirectly, for guiding heat which accompanies the emission of light by said light source; a light receiving element for receiving light reflected from said disk-shaped information recording medium; a sheet-shaped flexible circuit for feeding power to said light source and said light receiving element and communicating signals from said light receiving element; an optical bench for holding at least said light source, said radiator plate and said light receiving element; and a thermally conductive optical head cover fixed to said optical bench, in which said radiator plate and the heat transfer member provided in said flexible circuit are brought into contact with each other, said flexible circuit is caused to guide heat from said radiator plate and, by bringing into contact the heat transfer member of said flexible circuit and said optical head cover with each other, heat generated by said light source is radiated through said light source through said optical head cover, said flexible circuit and said radiator plate, characterized in that said optical head feed apparatus comprises a feed nut fixed to said optical head cover and having thermal conductivity; and a thermally conductive feed screw, fitted into said feed nut, for driving said optical head by rotating in the radial direction of said disk-shaped information recording medium, and said optical head cover and said feed nut are either integrally configured or brought into contact with each other in a thermally conductive state thereby to transfer heat generated by said light source and transferred to said optical head cover to said feed screw through said feed nut and to radiate it.

20. An optical head feed apparatus for feeding an optical head, said optical head having a light source for generating luminous energy required for recording on a disk-shaped information recording medium or reproducing information recorded on said disk-shaped information recording medium; a radiator plate, in contact with said light source either directly or indirectly, for guiding heat which accompanies the emission of light by said light source; an objective lens which is means for focusing light on said disk-shaped information recording medium; an objective lens drive unit for driving said objective lens in the focal and radial direction of said disk-shaped information recording medium; a light receiving element for receiving light reflected from said disk-shaped information recording medium; a sheet-shaped flexible circuit for feeding power and communicating signals to said light source and said light receiving element; a thermally conductive heat transfer member; an optical bench for holding at least said light source, said objective lens drive unit, said radiator plate, said light receiving element and said heat transfer member; and a thermally conductive optical head cover fixed to said optical bench, said radiator plate and said heat transfer member are brought into contact with each other, said heat transfer member is caused to guide heat from said radiator plate and, by bringing into contact said heat transfer member and said optical head cover with each other, heat generated by said light source is radiated by said light source through said optical head cover, said heat transfer member and said radiator plate, characterized in that said optical head feed apparatus comprises a feed nut fixed to said optical head cover and having thermal conductivity; and a thermally conductive feed screw, fitted into said feed nut, for driving said optical head by rotating in the radial direction of said disk-shaped information recording medium, and said optical head cover and said feed nut are either integrally configured or brought into contact with each other in a thermally conductive state thereby to transfer heat generated by said light source and transferred to said optical head cover to said feed screw through said feed nut and to radiate it.

21. An optical head feed apparatus for feeding an optical head, said optical head having a light source for generating luminous energy required for recording on a disk-shaped information recording medium or reproducing information recorded on said disk-shaped information recording medium; a radiator plate, in contact with said light source either directly or indirectly, for guiding heat which accompanies the emission of light by said light source; an objective lens which is means for focusing light on said disk-shaped information recording medium; an objective lens drive unit for driving said objective lens in the focal and radial direction of said disk-shaped information recording medium; a light receiving element for receiving light reflected from said disk-shaped information recording medium; a sheet-shaped flexible circuit for feeding power and communicating signals to said light source and said light receiving element; a thermally conductive heat transfer member; and an optical bench for holding at least said light source, said objective lens drive unit, said radiator plate, said light receiving element and said heat transfer member, characterized in that said optical head feed apparatus comprises a thermally conductive feed nut; and a thermally conductive feed screw, fitted into said feed nut, for driving said optical head by rotating in the radial direction of said disk-shaped information recording medium, and said heat transfer member and said feed nut are either integrally configured or brought into contact with each other in a thermally conductive state thereby to transfer heat generated by said light source and transferred to said heat transfer member to said feed screw through said feed nut and to radiate it.

22. The optical head feed apparatus as set forth in any of claim 20 or 21, characterized in that a GND line formed in said light receiving element is connected to said radiator plate to set the potential of said radiator plate to GND, said radiator plate is brought into contact with said heat transfer member, and said optical head cover and said heat transfer member are also brought into contact with each other to set the potential of the optical head cover to GND.

23. The optical head feed apparatus as set forth in any of claim 19, 20 or 21, characterized in that a GND line formed in said light receiving element is connected to said radiator plate to set the potential of said radiator plate to GND, said radiator plate is brought into contact with the GND line of said flexible circuit or said heat transfer section, and said optical head cover and the GND line of said flexible circuit or said heat transfer section are also brought into contact with each other to set the potential of the optical head cover to GND.

24. The optical head feed apparatus as set forth in any of claim 19, 20 or 21, characterized in that said optical bench is made of metal, and the heat of said optical head cover is also radiated by said optical bench.

25. The optical head feed apparatus as set forth in any of claim 19, 20 or 21, characterized in that said optical bench is not made of metal.

26. The optical head feed apparatus as set forth in any of claim 19, 20 or 21, characterized in that said optical bench is made of metal, and the heat of said optical head cover not only is radiated by said optical bench but also is transferred through said optical bench to said feed screw and radiated.

27. The optical head feed apparatus as set forth in any of claim 19, 20 or 21, characterized in that said feed screw is rotatably held by a metal-made optical head feed chassis, and said feed screw and said optical head feed chassis are brought into contact with each other, either directly or indirectly, to transfer heat transferred to said feed screw to said optical head feed chassis.

\* \* \* \* \*